United States Patent
Ock et al.

(10) Patent No.: US 10,984,318 B2
(45) Date of Patent: Apr. 20, 2021

(54) WORD SEMANTIC EMBEDDING APPARATUS AND METHOD USING LEXICAL SEMANTIC NETWORK AND HOMOGRAPH DISAMBIGUATING APPARATUS AND METHOD USING LEXICAL SEMANTIC NETWORK AND WORD EMBEDDING

(71) Applicant: UNIVERSITY OF ULSAN FOUNDATION FOR INDUSTRY COOPERATION, Ulsan (KR)

(72) Inventors: Cheol Young Ock, Ulsan (KR); Joon Choul Shin, Ulsan (KR); Ju Sang Lee, Ulsan (KR)

(73) Assignee: UNIVERSITY OF ULSAN FOUNDATION FOR INDUSTRY COOPERATION, Ulsan (KR)

( * ) Notice: Subject to any disclaimer, the term of this patent is extended or adjusted under 35 U.S.C. 154(b) by 63 days.

(21) Appl. No.: 16/323,230

(22) PCT Filed: May 17, 2017

(86) PCT No.: PCT/KR2017/005126
§ 371 (c)(1),
(2) Date: Feb. 4, 2019

(87) PCT Pub. No.: WO2017/217661
PCT Pub. Date: Dec. 21, 2017

(65) Prior Publication Data
US 2019/0188263 A1    Jun. 20, 2019

(30) Foreign Application Priority Data

Jun. 15, 2016  (KR) .................. 10-2016-0074758
Jun. 15, 2016  (KR) .................. 10-2016-0074761

(51) Int. Cl.
*G06F 40/30* (2020.01)
*G06N 3/08* (2006.01)
(Continued)

(52) U.S. Cl.
CPC ............. *G06N 3/08* (2013.01); *G06F 40/216* (2020.01); *G06F 40/247* (2020.01);
(Continued)

(58) Field of Classification Search
CPC ...... G06F 3/167; G06F 16/367; G06F 16/532; G06F 40/186; G06F 40/216;
(Continued)

(56) References Cited

U.S. PATENT DOCUMENTS 6,823,301 B1 * 11/2004 Ishikura ................ G06F 40/216
704/9
7,028,038 B1 *  4/2006 Pakhomov ............ G06F 40/284
707/765
(Continued)

FOREIGN PATENT DOCUMENTS

JP    2012-108570 A    6/2012
KR    10-2002-0036059 A    5/2002
(Continued)

OTHER PUBLICATIONS

International Search Report issued in corresponding International Application No. PCT/KR2017/005126 dated Aug. 28, 2017, with translation (5 pages).
(Continued)

*Primary Examiner* — Gerald Gauthier
(74) *Attorney, Agent, or Firm* — Osha Bergman Watanabe & Burton LLP

(57) ABSTRACT

A word semantic embedding apparatus includes: a data storing unit to store a lexical semantic network including word dictionary data and word semantic data; a word list
(Continued)

generating unit to extract vocabularies having a predetermined part of speech from the stored word dictionary data and generate a list of words to be learned; a processing data generating unit to bring the generated list of words to be learned and the word semantic data of a word to be learned included in the list of words to be learned from the data storing unit and process the data suitable for word embedding learning to generate processing data; and a word embedding learning unit to learn the word to be learned through the word embedding learning using a learning model formed of an input/output layer and a projection layer with the generated processing data to generate a word vector.

19 Claims, 11 Drawing Sheets

(51) Int. Cl.
  *G06N 3/04*       (2006.01)
  *G06N 5/02*       (2006.01)
  *G06F 40/216*     (2020.01)
  *G06F 40/247*     (2020.01)
  *G06F 40/284*     (2020.01)
  *G10L 15/06*      (2013.01)

(52) U.S. Cl.
  CPC ........... *G06F 40/284* (2020.01); *G06F 40/30* (2020.01); *G06N 3/0427* (2013.01); *G06N 3/0445* (2013.01); *G06N 3/0454* (2013.01); *G06N 3/0472* (2013.01); *G06N 3/084* (2013.01); *G06N 5/022* (2013.01); *G10L 15/063* (2013.01)

(58) Field of Classification Search
  CPC .... G06F 40/247; G06F 40/284; G06F 40/289; G06F 40/30; G06F 9/54; G06F 40/253; G06F 16/278; G06F 16/9024; G06F 16/9535; G06F 40/117; G06F 16/289; G06F 16/30; G06F 16/35; G06N 3/0427; G06N 3/0445; G06N 3/0454; G06N 3/0472; G06N 3/084; G06N 5/022; G06N 20/00; G10L 15/063; G10L 15/1822; H04L 61/3025; H04L 67/10; G06K 9/6232; G06Q 30/0201
  USPC ......... 358/1.1; 600/25; 704/9, 260; 707/738, 707/739, 756, 765, 812; 706/46, 11; 715/753
  See application file for complete search history.

(56) References Cited

U.S. PATENT DOCUMENTS

| | | | | |
|---|---|---|---|---|
| 7,565,282 | B2* | 7/2009 | Carus | G10L 15/063 704/251 |
| 7,937,263 | B2* | 5/2011 | Carrier | G06F 40/284 704/9 |
| 8,538,743 | B2* | 9/2013 | Gago | G10L 13/08 704/9 |
| 9,607,616 | B2* | 3/2017 | Watanabe | G10L 15/1822 |
| 9,633,007 | B1* | 4/2017 | Brun | G06F 40/284 |
| 9,875,258 | B1* | 1/2018 | Hsiao | G06F 16/5846 |
| 10,318,871 | B2* | 6/2019 | Cheyer | G06N 5/022 |
| 10,409,910 | B2* | 9/2019 | Seow | G06F 40/284 |
| 10,515,138 | B2* | 12/2019 | Walker | G06F 40/103 |
| 10,733,619 | B1* | 8/2020 | Newman | G06Q 30/0201 |
| 2005/0197524 | A1* | 9/2005 | Miller, III | H04R 25/604 600/25 |
| 2006/0277045 | A1* | 12/2006 | Gleason | G10L 13/08 704/260 |
| 2007/0035745 | A1* | 2/2007 | Izumi | G06F 40/166 358/1.1 |
| 2007/0083359 | A1* | 4/2007 | Bender | G06F 40/58 704/9 |
| 2009/0319274 | A1* | 12/2009 | Gross | H04L 63/102 704/260 |
| 2010/0049684 | A1* | 2/2010 | Adriaansen | G06F 40/117 706/46 |
| 2011/0093256 | A1* | 4/2011 | Williams | G06F 40/30 704/9 |
| 2011/0202532 | A1* | 8/2011 | Nakazawa | G06F 40/30 707/738 |
| 2013/0204885 | A1* | 8/2013 | Clinchant | G06K 9/4676 707/756 |
| 2014/0067368 | A1* | 3/2014 | Yih | G06F 16/3338 704/9 |
| 2014/0096035 | A1* | 4/2014 | Hall | G06Q 30/0631 715/753 |
| 2015/0095017 | A1* | 4/2015 | Mnih | G06F 40/242 704/9 |
| 2015/0120735 | A1* | 4/2015 | Tsuchida | G06F 16/374 707/738 |
| 2015/0120788 | A1* | 4/2015 | Brun | G06F 16/22 707/812 |
| 2015/0127323 | A1* | 5/2015 | Jacquet | G06F 40/211 704/9 |
| 2015/0193428 | A1* | 7/2015 | Lim | G06F 40/30 704/9 |
| 2016/0012123 | A1* | 1/2016 | Hu | G06F 16/36 707/739 |
| 2016/0155058 | A1* | 6/2016 | Oh | G06N 20/10 706/11 |
| 2016/0162467 | A1* | 6/2016 | Munro | G06F 40/30 704/9 |
| 2016/0224541 | A1* | 8/2016 | Yakovlev | G06F 40/30 |
| 2016/0247061 | A1* | 8/2016 | Trask | G06N 3/04 |
| 2016/0260430 | A1* | 9/2016 | Panemangalore | G10L 15/1822 |
| 2016/0267187 | A1* | 9/2016 | Gabara | G06F 16/9535 |
| 2016/0321243 | A1* | 11/2016 | Walia | G06F 16/35 |
| 2016/0328386 | A1* | 11/2016 | Cross, III | G06F 16/36 |
| 2017/0068661 | A1* | 3/2017 | Yu | G06F 40/169 |
| 2017/0132498 | A1* | 5/2017 | Cohen | G06N 3/08 |
| 2017/0132526 | A1* | 5/2017 | Cohen | G06N 3/0454 |
| 2017/0154258 | A1* | 6/2017 | Liu | G06N 3/0445 |
| 2017/0270100 | A1* | 9/2017 | Audhkhasi | G06F 40/289 |
| 2017/0286396 | A1* | 10/2017 | Sandor | G06F 40/35 |
| 2017/0286401 | A1* | 10/2017 | He | G06N 3/0454 |
| 2017/0286529 | A1* | 10/2017 | O'Neill | G06F 40/279 |
| 2017/0300565 | A1* | 10/2017 | Calapodescu | G06F 16/278 |
| 2017/0300828 | A1* | 10/2017 | Feng | G06N 20/00 |
| 2017/0329760 | A1* | 11/2017 | Rachevsky | G06F 40/247 |
| 2017/0351953 | A1* | 12/2017 | Raemy | G06F 40/284 |
| 2019/0188263 | A1* | 6/2019 | Ock | G06N 5/022 |

FOREIGN PATENT DOCUMENTS

| | | |
|---|---|---|
| KR | 10-0952418 B1 | 4/2010 |
| KR | 10-1508070 B1 | 4/2015 |

OTHER PUBLICATIONS

International Preliminary Report on Patentability issued in corresponding International Application No. PCT/KR2017/005126 dated Dec. 18, 2018 (13 pages).
Written Opinion of the International Searching Authority issued in corresponding International Application No. PCT/KR2017/005126, with translation (19 pages).
Na, Seung-Hoon, et. al., "Deep Learning for Natural Language Processing", Communications of the Korean Institute of Information Scientists and Engineers, vol. 33, No. 10, pp. 28-39, Oct. 2015, with translation (36 pages).

* cited by examiner

WORD SEMANTIC EMBEDDING APPARATUS AND METHOD USING LEXICAL SEMANTIC NETWORK AND HOMOGRAPH DISAMBIGUATING APPARATUS AND METHOD USING LEXICAL SEMANTIC NETWORK AND WORD EMBEDDING

TECHNICAL FIELD

The present invention relates to a word semantic embedding apparatus and method using a lexical semantic network, and more particularly, to a word semantic embedding apparatus and method using a lexical semantic network which are capable of generating a list of words to be learned and semantic information of a word to be learned from a lexical semantic network and learning word embedding with less word data through word embedding learning using the generated list of words to be learned and the semantic information of the word to be learned.

The present invention relates to a homograph disambiguating apparatus and method using a lexical semantic network and word embedding, and more particularly, to a homograph disambiguating apparatus and method using a lexical semantic network and word embedding which are capable of easily disambiguating a homograph for an unlearned pattern by learning through word embedding learning using a list of words to be learned, a converted corpus, and word semantic data from various resources (for example, a corpus, a standard unabridged dictionary, and a lexical semantic network) and comparing a similarity between the homograph and adjacent words to disambiguate the homograph.

BACKGROUND ART

Recently, as the computer versus human Go match becomes a big issue, interest in machine learning is increasing among general public. Among the machine learning, there are many natural language processing systems using deep learning and related researches are actively being conducted.

In a natural language processing system using machine learning, it is important to convert words expressed by letters into numbers. When words are expressed in a one-hot manner, since a vector dimension is determined according to an amount of words, the words may be expressed by a high dimensional vector. Here, according to the one-hot method, corresponding words are expressed by 1 and the remaining is expressed by 0.

When the words are expressed in hundreds of thousands of dimensions using the one-hot method, inputs become very large in the natural language processing using deep learning. As a method for solving the problem of the one-hot method, word embedding has appeared.

The word embedding is a method of expressing words by a low dimensional vector using a neural network and a large amount of corpuses. The word embedding is used for pre-training before using the natural language processing for deep learning. Further, there are several study results using word embedding itself.

In the beginning of the word embedding, the learning is performed using a word adjacent to a word to be learned from a sentence using a large amount of corpuses. The initial word embedding method performs learning such that words having similar adjacent words in the corpus have similar vectors. It is a way of learning through a positional approach of the word rather than a semantic approach of the word. In the beginning, a neural network language model (NNLM) using a basic neural network is used for word embedding. Thereafter, a recurrent neural network language model (RNNLM) using previous learning for next learning and word2vec with improved learning speed have appeared.

As the information technology develops, a technology for automatically processing natural languages is also developing. These technologies are applied to document classification and machine translation portal search. Even though Korean is an agglutinative language so that it is difficult to analyze morphemes, recently, morphological restoration and tagging of parts of speech have shown a high accuracy (for example, approximately 98%) by a machine learning method using learning corpuses.

However, the accuracy of disambiguation of homographs is still low (approximately, 96.5%) and in fact, it is easy to find cases when the meaning of a word is completely mistranslated in machine translation. In order to reduce that kind of errors, it needs to focus to improve the accuracy of disambiguation of the homographs.

As a method for disambiguating a Korean homograph using context information, there are mainly a corpus learning method and a lexical network learning method. The former is a statistic learning method and the latter is a knowledge-based method. Like Sejong corpus, the corpus learning method learns a pattern for adjacent words by learning a large amount of tagged corpuses. According to this method, all or a part of the adjacent word is stored, that is, a whole word, a partial morpheme, a part of speech, or syllables are stored.

However, the corpus learning method of the related art may not have any effect unless it is learned directly. For example, if it is assumed that a sentence "apples are fruits" is analyzed, when an example that "apples" is adjacent to "fruits" is included in the corpus, the method works. However, such a sentence is not included in the Sejong corpus. Even though a similar sentence such as "apples are plants" or "apples are seeds" is included in the corpus, if the "fruits" is not directly represented, there is no effect. However, a rate of tagging "사과 sagwa" as "apple" is measured in individual morpheme units to be used. According to this method, only an accuracy as high as a baseline may be expected.

As described above, since unlearned patterns cannot be processed at all by the corpus learning method of the related art, recently, studies using a lexical network such as the WordNet, the Korean lexical semantic network (Korlex or Korean Wordnet) or the Korean lexical map (UWordMap) have been conducted. These methods have problems similar to those of the corpus learning method in that it is not effective when a hypernym or hyponym relationship or a predicate-noun relation is not registered in the lexical network. However, it may be evaluated that a recall rate is partially much higher. The reason is that most well-known nouns are registered in a superordinate or subordinate network and the relationship of predicate-noun is created only using a least upper bound node in a hypernym and hyponym network. When it is assumed that one specific node is randomly selected, it may be expected that hundreds or thousands of sub nodes are included below the node. However, since the predicate-noun relation network itself is very poor, the problem of the recall rate still remains. In order to alleviate the problem, it is necessary to continuously supplement the lexical network at a great expense.

Recently, as the usefulness of the word embedding is known, attempts have been made to apply the word embedding to various fields of natural language processing or natural language understanding. As a representative word embedding model, there is a word2vec. Essentially, the word embedding allows grouping similar words together or calculating a degree of a semantic similarity or correlation between words.

In the meantime, a homograph disambiguating technique is essential to develop a semantic processing system. According to the studies until recent years, the corpus learning based methods have shown relatively accurate results. The corpus learning method of the related art memorizes a part (syllable or morpheme) of contents of the adjacent word as it is and disambiguates the homograph.

However, the corpus learning method of the related art has a low accuracy for a pattern which has never been learned.

DISCLOSURE

Technical Problem

The exemplary embodiments of the present invention are directed to providing a word semantic embedding apparatus and method using a lexical semantic network which are capable of representing a semantic relationship and correlation of words by a vector by generating processing data using a list of words to be learned and word semantic data (for example, lexical definitions, hypernyms, or antonyms) of the words to be learned in a lexical semantic network and learning the words with the generated processing data using a feature mirror model which is a modified skip gram model of the word semantic embedding and a negative sampling.

An exemplary embodiment of the present invention is directed to providing a word semantic embedding apparatus and method using a lexical semantic network which perform word embedding learning using semantic information rather than word embedding of the related so that the word embedding leaning is possible with less learning data and a learning time is shortened.

Further, an exemplary embodiment of the present invention is directed to providing a word semantic embedding apparatus and method using a lexical semantic network which are effective to learn words which less frequently appear because the learning is performed based on the meaning of the word to be learned rather than positional information of the words which simply appear and express more words by a vector as compared with the word embedding of the related art because words appearing in the dictionary is the target.

Further, an exemplary embodiment of the present invention is directed to providing a word semantic embedding apparatus and method using a lexical semantic network which generate a word vector through word semantic embedding learning using word semantic data rather than position based word embedding of the related so that the relationship between words may be obtained through a cosine similarity and find a homographic relationship or synonyms which cannot be obtained from the word embedding of the related art.

Furthermore, an exemplary embodiment of the present invention is directed to providing a word semantic embedding apparatus and method using a lexical semantic network which expand a list of words to be learned to adverbs and dependent nouns and additionally apply semantic information of the words.

The exemplary embodiments of the present invention are directed to providing a homograph disambiguating apparatus and method using a lexical semantic network and word embedding which are capable of easily disambiguating a homograph for an unlearned pattern by learning through word embedding learning using a list of words to be learned, a converted corpus, and word semantic data from various resources (for example, a corpus, a standard unabridged dictionary, and a lexical semantic network) and comparing a similarity between the homograph and adjacent words to disambiguate the homograph.

An exemplary embodiment of the present invention is directed to providing a homograph disambiguating apparatus and method using a lexical semantic network and word embedding which perform word embedding learning using semantic information of a substantial morpheme in a corpus rather than word embedding of the related so that the word embedding leaning is possible with less learning data and a learning time is shortened.

Further, an exemplary embodiment of the present invention is directed to providing a homograph disambiguating apparatus and method using a lexical semantic network and word embedding which are effective for learning words which less frequently appear because the learning is performed based on the meaning of the word to be learned rather than positional information of the words which simply appear and express more words by a vector as compared with the word embedding of the related art because words appearing in the dictionary is the target.

Furthermore, an exemplary embodiment of the present invention is directed to providing a homograph disambiguating apparatus and method using a lexical semantic network and word embedding which generate a word vector by processing words adjacent to a substantial morpheme and word semantic data (for example, a hypernym) of the adjacent words with the adjacent words rather than position based word embedding of the related so that the relationship between words may be found from a cosine similarity.

Technical Solution

A first aspect of the present invention provides a word semantic embedding apparatus using a lexical semantic network including: a data storing unit to store a lexical semantic network including word dictionary data and word semantic data; a word list generating unit to extract vocabularies having a predetermined part of speech from the stored word dictionary data and generate a list of words to be learned; a processing data generating unit to bring the generated list of words to be learned and the word semantic data of a word to be learned included in the list of words to be learned from the data storing unit and process the data suitable for word embedding learning to generate processing data; and a word embedding learning unit to learn the word to be learned through the word embedding learning using a learning model formed of an input/output layer and a projection layer with the generated processing data to generate a word vector.

The apparatus may further include a synonym calculating unit to calculate a cosine similarity using the generated word vector to calculate a synonym of the input word.

The synonym calculating unit may receive first and second input words, extract a predetermined number of synonyms using the cosine similarity for words closest to the second input word, and calculate the cosine similarity between the extracted synonyms and the first input word to calculate a word having the highest similarity as a synonym of the first and second input words.

The synonym calculating unit may calculate a synonym obtained by modifying an attribute of an input word through an attribute calculating process of a word vector of the input word and a word vector of an attribute word having a predetermined attribute.

The word list generating unit may extract vocabularies having a predetermined part of speech from the lexical semantic network in which nouns, verbs or adjectives, adverbs, and dependent nouns are interconnected to each other with semantic constraints to generate a list of words to be learned.

The processing data generating unit may generate learning processing data using word semantic data including at least one of a definition, hypernyms, and antonyms of a word included in the generated list of words to be learned.

The word embedding learning unit may learn a wrong answer other than the processing data as a word to be learned, using negative sampling in the word embedding.

The word embedding learning unit may locate processing data in which the word to be learned and word semantic data of the word to be learned are processed, among the processing data, in one input/output layer in which an input layer and an output layer of skip-gram in the word embedding are combined and learn the word to be learned through the word embedding learning using a learning model formed of the input/output layer and a mirror layer in which the processing data is located to generate a word vector.

The word embedding learning unit may perform the word embedding learning through a feedforward process and a back propagation process of the word embedding learning and may not change a weight value connected to word semantic data of a word to be learned during the back propagation process and may change a weight value connected to the word to be learned.

A second aspect of the present invention provides a word semantic embedding method using a lexical semantic network including: generating a list of words to be learned by extracting vocabularies having a predetermined part of speech from word dictionary data included in a lexical semantic network, generating processing data by bringing the generated list of words to be learned and the word semantic data of a word to be learned included in the list of words to be learned and processing the data suitable for word embedding learning; and generating a word vector by learning the word to be learned through the word embedding learning using a learning model formed of an input/output layer and a projection layer with the generated processing data.

The method may further include calculating a synonym of the input word by calculating a cosine similarity using the generated word vector.

The calculating of a synonym may include receiving first and second input words, extracting a predetermined number of synonyms using the cosine similarity for words closest to the second input word, and calculating the cosine similarity between the extracted synonyms and the first input word to calculate a word having the highest similarity as a synonym of the first and second input words.

The calculating of a synonym may calculate a synonym obtained by modifying an attribute of an input word through an attribute calculating process of a word vector of the input word and a word vector of an attribute word having a predetermined attribute.

The generating of a list of words to be learned may extract vocabularies having a predetermined part of speech from the lexical semantic network in which nouns, verbs or adjectives, adverbs, and dependent nouns are interconnected to each other with semantic constraints to generate a list of words to be learned.

The generating of processing data may generate learning processing data using word semantic data including at least one of a definition, hypernyms, and antonyms of a word included in the generated list of words to be learned.

The generating of a word vector may learn a wrong answer other than the processing data as a word to be learned, using negative sampling in the word embedding.

The generating of a word vector may locate processing data in which the word to be learned and word semantic data of the word to be learned are processed, among the processing data, in one input/output layer in which an input layer and an output layer of skip-gram in the word embedding are combined and learn the word to be learned through the word embedding learning using a learning model formed of the input/output layer and a mirror layer in which the processing data is located to generate a word vector.

The generating of a word vector may perform the word embedding learning through a feedforward process and a back propagation process of the word embedding learning and may not change a weight value connected to word semantic data of a word to be learned during the back propagation process and may change a weight value connected to the word to be learned.

In the meantime, a third aspect of the present invention provides a homograph disambiguating apparatus using a lexical semantic network and word embedding including: a data storing unit to store a corpus including at least one learning words, a standard unabridged dictionary including word semantic data, and a lexical semantic network; a word list generating unit to generate a list of words to be learned from the corpus; a processing data generating unit to convert convertible word semantic data among word semantic data of a word to be learned included in the generated word list into a corpus and process the generated list of words to be learned, the converted corpus, and the word semantic data to be suitable for the word embedding learning to generate a processing data; a word embedding learning unit to learn the word to be learned through the word embedding learning using a learning model formed of an input/output layer and a projection layer with the generated processing data to generate a word vector; and a homograph disambiguating unit to compare a similarity between a homograph and adjacent words using the generated word vector and disambiguate a homograph in accordance with a comparison result.

The data storing unit may store a corpus including at least one learning word, a standard unabridged dictionary including examples and definitions as word semantic data, and a lexical semantic network including predicate-noun relation information, hypernyms, and antonyms as word semantic data.

The processing data generating unit may convert at least one of a corpus including at least one learning word, examples and definitions included in a standard unabridged dictionary, and predicate-noun relation information included in the lexical semantic network into a form of corpus.

The processing data generating unit may process a word adjacent to the word to be learned and the hypernym of the adjacent word to be an adjacent word of the word to be learned in the converted corpus or process the predicate-noun relation information to be an adjacent word of the word to be learned.

The word embedding learning unit may locate processing data in which the word to be learned, the adjacent word, the predicate-noun relation information, and the antonyms are processed, among the processing data, in one input/output layer in which an input layer and an output layer of skip-gram in the word embedding are combined and learn the word to be learned through the word embedding learning using a learning model formed of the input/output layer and a mirror layer in which the processing data is located to generate a word vector.

The word embedding learning unit may perform the word embedding learning through a feedforward process and a back propagation process of the word embedding learning and may not change a weight value connected to processing data of a word to be learned during the back propagation process and may change a weight value connected to the word to be learned.

The word embedding learning unit may learn a wrong answer other than the processing data as a word to be learned, using negative sampling in the word embedding.

The word embedding learning unit may generate a word vector of a substantial morpheme which is adjacent to the word to be learned through the word embedding learning and excludes a postpositional particle or an end of the word.

The homograph disambiguating unit may disambiguate a homograph by comparing a similarity between a substantial morpheme of a homograph to be disambiguated and a substantial morpheme of an adjacent word using a word vector of the generated substantial morpheme.

In the meantime, a fourth aspect of the present invention provides a homograph disambiguating method using a lexical semantic network and word embedding, the method including: generating a list of words to be learned from a corpus including at least one learning word; converting convertible word semantic data among word semantic data of a word to be learned included in the generated word list into a corpus; generating processing data by processing the generated list of words to be learned, the converted corpus, and the word semantic data suitable for word embedding learning; generating a word vector by learning the word to be learned through the word embedding learning using a learning model formed of an input/output layer and a projection layer with the generated processing data; and comparing a similarity between a homograph and adjacent words using the generated word vector and disambiguating a homograph in accordance with a comparison result.

The converting into a corpus may convert convertible word semantic data among word semantic data in a standard unabridged dictionary including examples and definitions, predicate-noun relation information, and a lexical semantic network including hypernyms and antonyms into a corpus.

The converting into a corpus may convert at least one of a corpus including at least one learning word, examples and definitions included in a standard unabridged dictionary, and predicate-noun relation information included in the lexical semantic network into a form of corpus.

The generating of processing data may process a word adjacent to the word to be learned and the hypernym of the adjacent word to be an adjacent word of the word to be learned in the converted corpus or process the predicate-noun relation information to be an adjacent word of the word to be learned.

The generating of a word vector may locate processing data in which the word to be learned, the adjacent word, the predicate-noun relation information, and the antonyms are processed, among the processing data, in one input/output layer in which an input layer and an output layer of skip-gram in the word embedding are combined and learn the word to be learned through the word embedding learning using a learning model formed of the input/output layer and a mirror layer in which the processing data is located to generate a word vector.

The generating of a word vector may perform the word embedding learning through a feedforward process and a back propagation process of the word embedding learning and may not change a weight value connected to processing data of a word to be learned during the back propagation process and may change a weight value connected to the word to be learned.

The generating of a word vector may learn a wrong answer other than the processing data as a word to be learned, using negative sampling in the word embedding.

The generating of a word vector may generate a word vector of a substantial morpheme which is adjacent to the word to be learned through the word embedding learning and excludes a postpositional particle or an end of the word.

The disambiguating of a homograph may disambiguate a homograph by comparing a similarity between a substantial morpheme of a homograph to be disambiguated and a substantial morpheme of an adjacent word using a word vector of the generated substantial morpheme.

Advantageous Effects

According to the exemplary embodiment of the present invention, the word embedding learning is performed using semantic information rather than word embedding of the related art so that the word embedding learning is possible with less learning data and the learning time is shortened.

Further, according to the exemplary embodiment of the present invention, the learning is performed based on definitions of words to be learned, rather than simply appearing positional information so that it is efficient for learning words which less frequently appear and words appearing in the dictionary are the target so that more words than that of the word embedding of the related art may be expressed by a vector.

Further, according to the exemplary embodiment of the present invention, the word semantic embedding learning is performed rather than the word embedding of the related art so that the relationship between words may be found from a cosine similarity and a homographic relationship or synonyms which cannot be obtained from the word embedding of the related art can be found.

Further, according to the exemplary embodiment of the present invention, a list of words to be learned may be expanded to adverbs and dependent nouns and semantic information of the words may be additionally applied.

Moreover, according to the exemplary embodiment of the present invention, human level semantic reasoning may be allowed using a word vector through word semantic embedding learning.

According to the exemplary embodiments of the present invention, it is possible to easily disambiguate a homograph for an unlearned pattern by learning through word embedding learning using a list of words to be learned, a converted corpus, and word semantic data from various resources (for example, a corpus, a standard unabridged dictionary, and a lexical semantic network) and comparing a similarity between the homograph and adjacent words to disambiguate the homograph.

According to the exemplary embodiment of the present invention, the word embedding learning is performed using semantic information of a substantial morpheme in the corpus rather than word embedding of the related art so that the word embedding learning is possible with less learning data and the learning time is shortened.

Further, according to the exemplary embodiment of the present invention, the learning is performed based on the meaning of words to be learned, rather than simply appearing word positional information so that it is efficient for learning words which less frequently appear and words appearing in the dictionary are the target so that more words than that of the word embedding of the related art may be expressed by a vector.

Furthermore, according to the exemplary embodiment of the present invention, a word vector is generated by processing words adjacent to a substantial morpheme and word semantic data (for example, a hypernym) of the adjacent words with the adjacent words rather than position based word embedding of the related so that the relationship between words may be found from a cosine similarity.

MODES OF THE INVENTION

Figure 1:
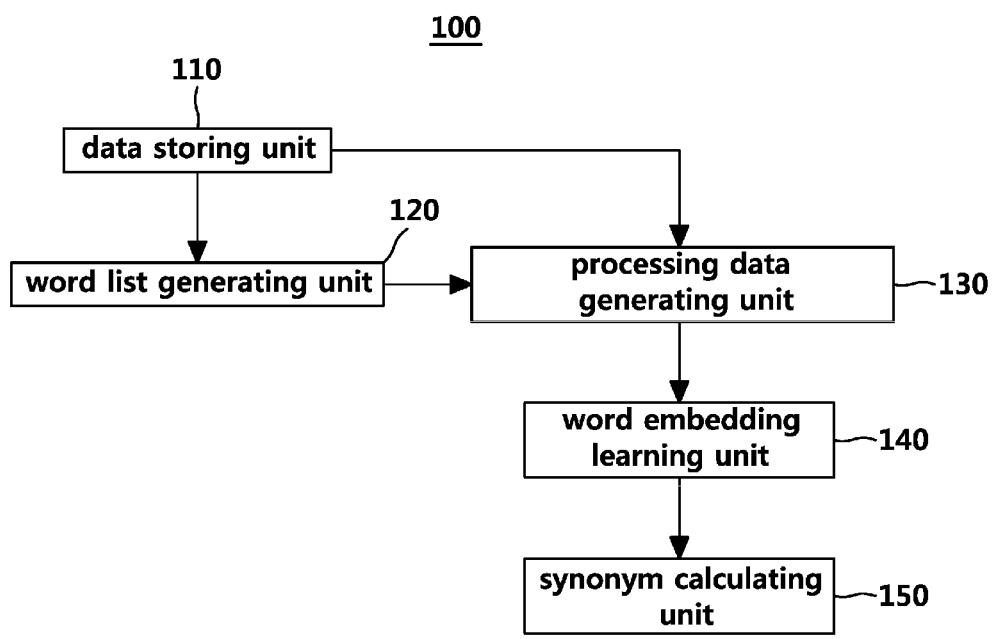
FIG. 1 is a diagram of a word semantic embedding apparatus using a lexical semantic network according to an exemplary embodiment of the present invention.

Hereinafter, embodiments of the present invention will be described with reference to the accompanying drawings. Parts which are required to understand an operation and an effect of the present invention will be mainly described in detail. In the description of the exemplary embodiment of the present invention, description of technical contents which are well known in the art and are not directly related to the present invention will be omitted. The reason is that unnecessary description is omitted to clearly transmit the gist of the present invention without obscuring the gist.

In the description of components of an exemplary embodiment, a component having the same name may be denoted by a different reference numeral in some drawings but may be denoted by the same reference numeral even in different drawings. However, even in this case, it does not mean that the component has different functions depending on the exemplary embodiment or the components have the same function in the different exemplary embodiments but the function of each of the components may be determined based on the description of the components in the corresponding exemplary embodiment.

FIG. 1 is a diagram of a word semantic embedding apparatus using a lexical semantic network according to an exemplary embodiment of the present invention.

As illustrated in FIG. 1, a word semantic embedding apparatus 100 using a lexical semantic network according to an exemplary embodiment of the present invention includes a data storing unit 110, a word list generating unit 120, a processing data generating unit 130, a word embedding learning unit 140, and a synonym calculating unit 150.

The word semantic embedding apparatus 100 according to an exemplary embodiment of the present invention generates a list of words to be learned from a lexical semantic network and generates processing data using lexical definition of words included in the generated list of words to be learned, hypernyms and antonyms of the word. The word semantic embedding apparatus 100 expresses a semantic relationship and a correlation of the words by a word vector through negative sampling in the word embedding and word embedding learning in which skip gram method is modified.

Here, the word semantic embedding apparatus 100 according to the exemplary embodiment of the present invention is applicable not only to Korean in which a lexical semantic network including word dictionary data and word semantic data can be constructed, but also to all languages such as English (WordNet) or Chinese (HowNet).

Hereinafter, specific configurations and operations of components of the word semantic embedding apparatus 100 using a lexical semantic network of FIG. 1 will be described.

The data storing unit 110 stores a lexical semantic network including word dictionary data and word semantic data. The word dictionary data includes words contained in the word dictionary. The word semantic data may include word semantic information of words contained in the word dictionary. For example, the word semantic data may include a definition, hypernyms, antonyms, and examples of the word.

The word semantic embedding apparatus 100 according to the exemplary embodiment of the present invention uses a lexical semantic network (UwordMap) as a type of a word to be learned and word semantic data. Here, the lexical semantic network is also referred to as a lexical map. The lexical semantic network refers to a lexical semantic network in which nouns, predicates, and adverbial vocabularies are interconnected to each other with semantic constraints based on a standard dictionary.

The word list generating unit 120 extracts vocabularies having a predetermined part of speech from the word dictionary data stored by the data storing unit 110 to generate a list of words to be learned.

Here, the word list generating unit 120 may generate a list of words to be learned using a lexical semantic network in which at least one vocabulary among nouns, verbs or adjectives, adverbs, and dependent nouns vocabularies is interconnected to each other. For example, the word list generating unit 120 configures words used to be learned and generates a list of a total of 387,152 words to be learned, from nouns and predicates among words existing in the lexical semantic network at the level of homograph excluding specific regional dialects (for example, North Korean dialects), patois, and dependent nouns or constructs a database.

The processing data generating unit 130 brings word semantic data of words included in the list of words to be learned generated in the word list generating unit 120 from the data storing unit 110 to process the word semantic data to be suitable for word embedding learning and generate learning processing data.

Here, the processing data generating unit 130 generates learning processing data using word semantic data including at least one of a definition, hypernyms, and antonyms of the word included in the list of words to be learned generated in the word list generating unit 120 to generate the learning processing data. For example, the processing data generating unit 130 uses nouns and predicates appearing in the word dictionary list in the definition of a word as processing data of the corresponding word. Further, in the case of a noun, the processing data generating unit 130 may use the hypernym and the antonym of the noun as processing data. The processing data generating unit 130 processes the words with input values and output values expressed in the one-hot manner to be suitable for word embedding learning to generate processing data.

The word embedding learning unit 140 learns words to be learned through the word embedding learning using a learning model formed of an input/output layer and a projection layer based on the processing data generated in the processing data generating unit 130 to generate a word vector.

Here, the word embedding learning unit 140 learns the words to be learned through the word embedding learning using a learning model formed of one input/output layer in which an input layer and an output layer of skip-gram in the word embedding are combined and a mirror layer to generate the word vector. The word embedding learning unit 140 learns the words to be learned through the word embedding learning using the learning model formed of the input/output layer and the mirror layer in which each processing data is located to generate a word vector.

In this case, the word embedding learning unit 140 changes a weight value connected to an input word without changing a weight value connected to an output word, during a back propagation process of the word embedding learning.

Further, the word embedding learning unit 140 may learn a wrong answer other than the processing data as a word to be learned, using negative sampling in the word embedding. The word embedding learning unit 140 performs negative sampling on the antonym. The word embedding learning unit 140 may learn by setting an output value as 0 only for the antonym. The word embedding learning unit 140 performs negative sampling on another homograph of the word to be learned. For example, when "사과_05/NNG" is learned, negative sampling may be performed on this word and another morpheme (사과_08/NNG) which is "사과" and whose part of speech is NNG.

As described above, the word semantic embedding apparatus 100 according to the exemplary embodiment of the present invention may construct the word list using the word dictionary data existing in the lexical semantic network. Further, the processing data is generated using the constructed word list and word semantic data (for example, definitions, hypernyms, and antonyms) of the lexical semantic network. Thereafter, the word semantic embedding apparatus 100 performs the word embedding learning using the learning model in which skip-gram of the word embedding is modified with the generated processing data to generate a word vector.

In the meantime, the word semantic embedding apparatus 100 according to the exemplary embodiment of the present invention may further include a synonym calculating unit 150 when a synonym is calculated using the word vector.

For example, the synonym calculating unit 150 calculates a cosine similarity using the word vector generated in the word embedding learning unit 140 to calculate a synonym of the input word.

As another example, the synonym calculating unit 150 receives first and second input words. The synonym calculating unit 150 extracts words closest to the second input word as a predetermined number of synonyms using the cosine similarity and calculates the cosine similarity between the extracted synonyms and the first input word to calculate a word having the highest similarity as a synonym of the first and second input words.

As still another example, the synonym calculating unit 150 calculates a synonym obtained by modifying an attribute of the input word through an attribute calculating process of the word vector of the input word and a word vector of an attribute word having a predetermined attribute.

As described above, when the machine learning is used in the field of natural language processing, it is important to express the word. The word embedding is a method of changing letters into a vector which is understandable by a computer. The word embedding learns with a low dimensional vector using an artificial neural network.

As an experimental example, the word semantic embedding apparatus 100 according to the exemplary embodiment of the present invention constructs a word list of 387,152 nouns and predicates using the lexical semantic network and generates the processing data using a lexical definition and hypernyms and antonyms of a noun.

Further, the word semantic embedding apparatus 100 according to the exemplary embodiment of the present invention learns using a learning model in which skip-gram method of the word embedding is modified and the negative sampling. The word semantic embedding apparatus 100 according to the exemplary embodiment of the present invention may learn at a higher speed through less data than the word expression method of the related art and show that words having a semantic similarity are adjacent to each other. This shows that a simple combination of word vectors may be meaningful.

Figure 2:
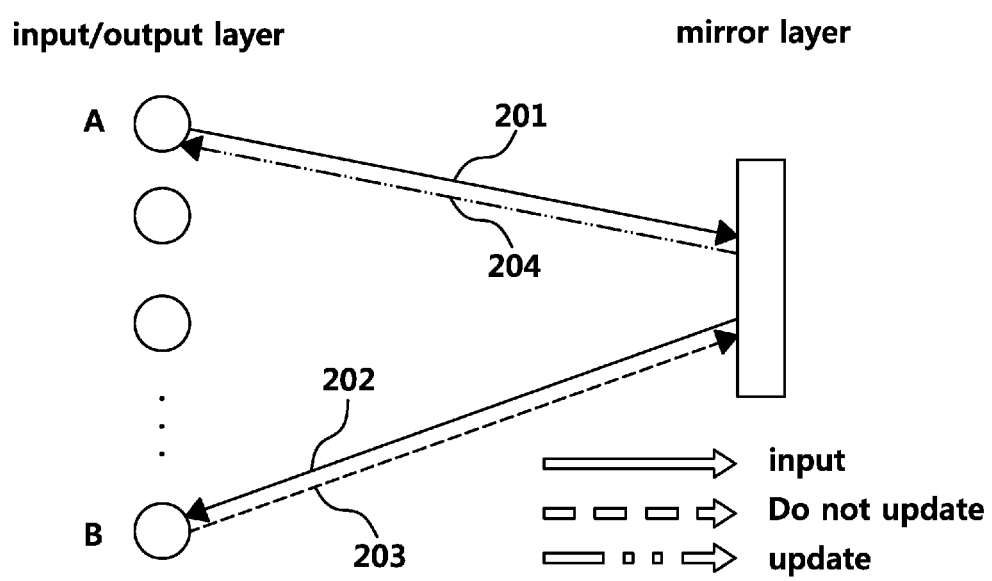
FIG. 2 is an explanation view of a learning model formed by an input/output layer and a mirror layer according to an exemplary embodiment of the present invention.

FIG. 2 is an explanation view of a learning model formed by an input/output layer and a mirror layer according to an exemplary embodiment of the present invention.

As illustrated in FIG. 2, the word semantic embedding apparatus 100 according to the exemplary embodiment of the present invention uses a learning model in which the skip gram of the word embedding of the related art or word2vec is modified and the negative sampling to learn the words. Here, the input value and a result value of the processing data are expressed in a one-hot manner to be used.

Further, the word semantic embedding apparatus 100 according to the exemplary embodiment of the present invention expresses the words by a 50 dimensional word vector.

FIG. 2 illustrates a learning model used in the exemplary embodiment of the present invention. The word semantic embedding apparatus 100 learns a word A through main lines 201 and 202 using a weight value connected to a word B to learn the word A through the learning model. When the actual weight value is changed, the word semantic embedding apparatus 100 changes only the weight 204 connected to the word A to be learned but does not change a weight value 203 connected to the word B.

Such a learning model is used to include information of words connected to the word B in the word embedding result of the word A. Further, the learning model as illustrated in FIG. 2 is used to obtain a semantic chain effect between words. In this case, the word semantic embedding apparatus 100 learns by setting outputs values for the definition and the hypernym to be 1 and learns by setting an output value of the antonym to be 0.

Further, the word semantic embedding apparatus 100 learns wrong answers other than the learning data as each word using the negative sampling to increase the accuracy of the learning.

Hereinafter, a difference between a skip gram model of the word embedding of the related art and a feature mirror model which is a modified skip gram model according to the exemplary embodiment of the present invention will be described with reference to FIGS. 3 and 4.

Figure 3:
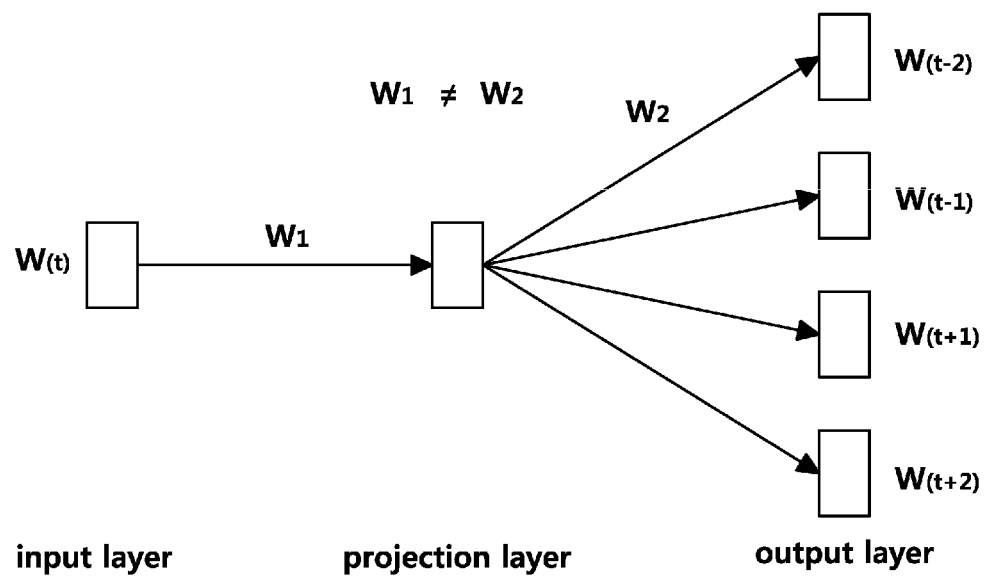
FIG. 3 is an explanation view of a skip-gram model in word embedding of the related art.
Figure 4:
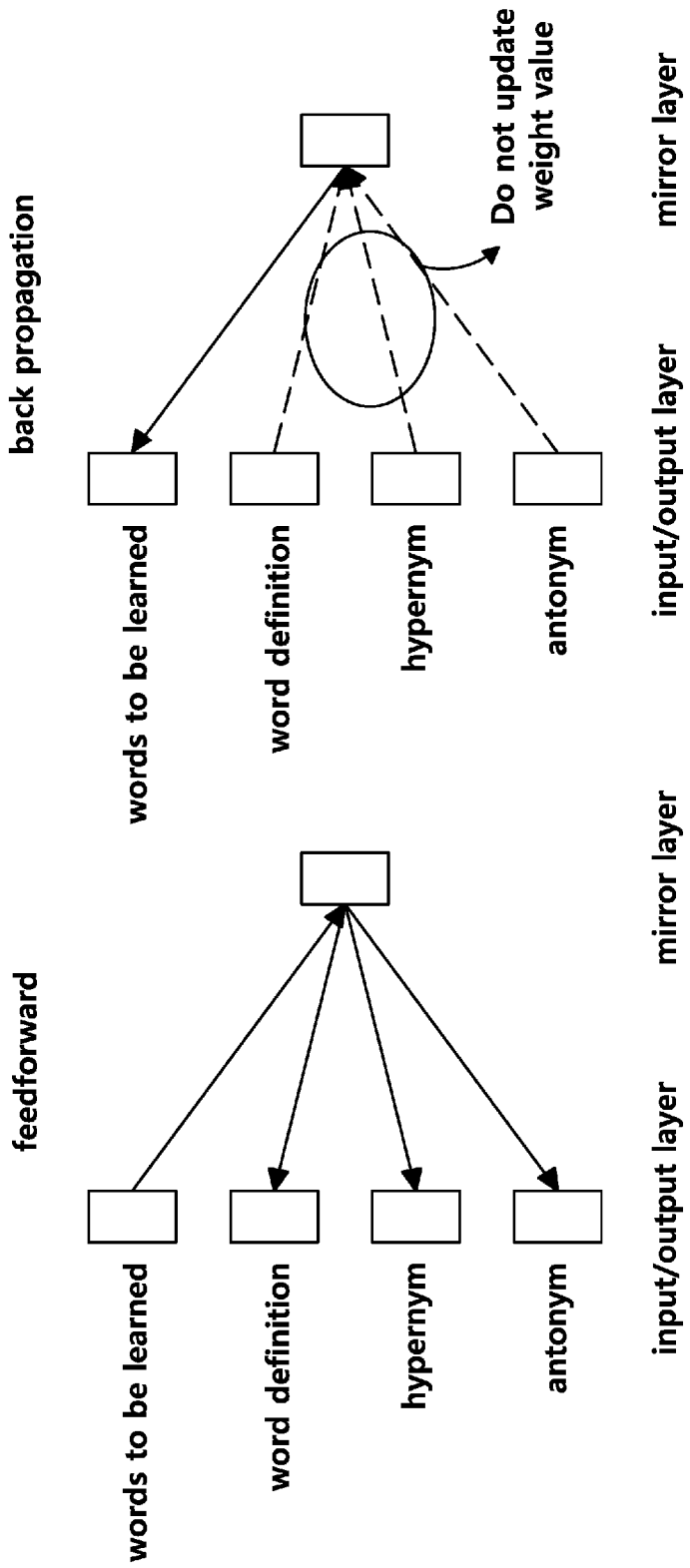
FIGS. 4A-4B are explanation views of a feature mirror model in a word semantic embedding apparatus according to an exemplary embodiment of the present invention.

FIG. 3 is an explanation view of a skip-gram model in word embedding of the related art.

As illustrated in FIG. 3, a skip-gram model of the related art is an artificial neural network configured using three layers including an input layer, a projection layer, and an output layer.

A word to be learned is input to the input layer in a one-hot manner Previous two words w(t−2) and w(t−1) and following two words w(t+1) and w(t+2) of the word used in the input layer are input to the output layer to be learned. In the skip gram model illustrated in FIG. 3, a main line between the input layer and the projection layer and a main line between the projection layer and the output line are configured by different values ($W_1 \neq W_2$)

FIGS. 4A-4B are explanation views of a feature mirror model in a word semantic embedding apparatus according to an exemplary embodiment of the present invention.

As illustrated in FIGS. 4A and 4B, the feature mirror model according to the exemplary embodiment of the present invention is formed of two layers. The feature mirror model is formed of one input/output layer in which the input layer and the output layer of the skip gram model of the related art are combined and a mirror layer. In the input/output layer of the feature mirror model according to the exemplary embodiment of the present invention, a word x(target) to be learned and word semantic data of the word to be learned are processed in the one-hot manner to be input. For example, the word semantic data may include word interpretation (word definition), hypernyms, and antonyms.

The word semantic embedding apparatus 100 performs the word embedding learning through a feedforward process and a back propagation process of the word embedding learning. The word semantic embedding apparatus 100 does not change the weight value connected to the word semantic data of a word to be learned, but changes the weight value connected to the word to be learned, during the back propagation process.

That is, when the learning is applied through the feature mirror model, the word semantic embedding apparatus 100 according to the exemplary embodiment of the present invention changes only a main line (weight value) connected to a word to be learned, that is a target word x(target) but does not change a main line (weight value) connected to the word definition, hypernyms, and antonyms of the word to be learned.

Hereinafter, the learning process using the skip gram model of the related art and the skip gram model according to the exemplary embodiment of the present invention will be described with reference to FIGS. 5 and 6.

Figure 5:
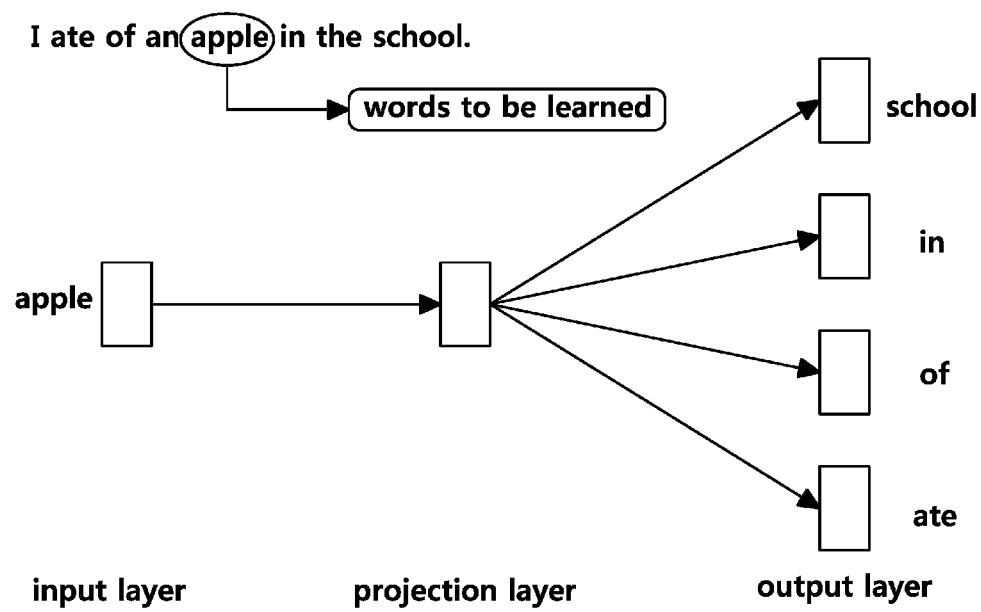
FIG. 5 is an exemplary view of a morpheme unit learning process using a skip-gram model of the related art.

FIG. 5 is an exemplary view of a morpheme unit learning process using a skip-gram model of the related art.

The word embedding method of the related art learns the word using neighboring words of the word to be learned in a sentence. As illustrated in FIG. 5, when a word to be learned is "apple" in a sentence "I ate of an apple in the school", the neighboring words, that is, "school", "in", "of", and "ate" which are neighboring morphemes are used for the word embedding method. A word which may not be semantically related to "apple" which is a word to be learned, but is adjacent to the word to be learned in the sentence is used for the word embedding method.

Here, in the word embedding method of the related art, a large number of corpuses with a morpheme semantic number is necessary for the number of words and accuracy. The result of the word embedding is affected by the amount of corpuses so that the word embedding method of the related art is recommended to use a large number of corpuses.

Figure 6A:
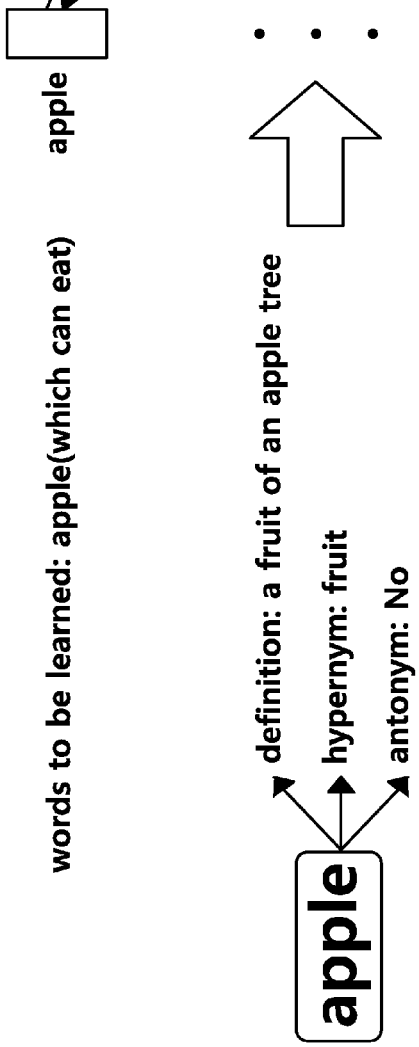
FIGS. 6A-6B are exemplary views of a word embedding learning process using a feature mirror model according to an exemplary embodiment of the present invention.
Figure 6B:
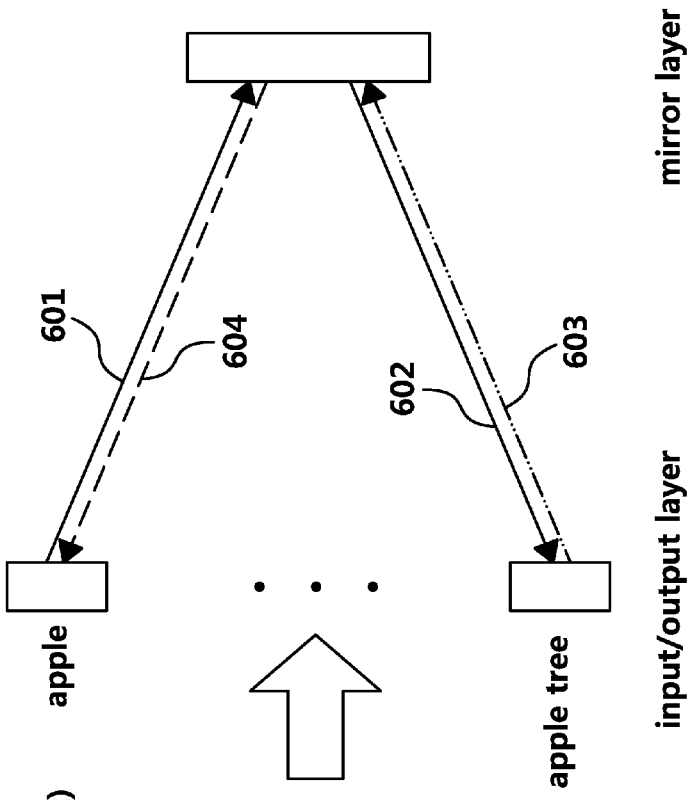

FIGS. 6A-6B are exemplary views of a word embedding learning process using a feature mirror model according to an exemplary embodiment of the present invention.

A process of learning a word to be learned, "apple (which can eat)" using the feature mirror model will be described with reference to FIGS. 6A-6B.

As illustrated in FIGS. 6A and 6B, the word semantic embedding apparatus 100 uses word semantic data of "apple tree" and 'fruit' obtained by extracting a noun and a predicate from a fruit of an apple tree which is the definition of the apple, as processing data. Further, the word semantic embedding apparatus 100 adds "fruit" which is a hypernym of "apple" which is a word to be learned as processing data of apple. Here, there is no antonym of "apple" which is a word to be learned, so that the antonym is not added as the processing data. If there is an antonym, the antonym is added.

After finding "apple tree", "seed", and "fruit" as the processing data of apple which is a word to be learned, word embedding learning is performed along the processes 601 to 604 using the learning model in the right.

For example, the word embedding learning process using a word "apple" which is a word to be learned and a word "apple tree" which is a definition will be described with reference to the following Equations 1 and 2.

$$y_{(apple, apple\ tree)} = \varphi\left[\sum_{n=0}^{m}(W_{n(apple)} * W_{n(apple\ tree)})\right] \quad [\text{Equation 1}]$$

Here, Wn(apple) is a vector of apple, Wn(apple tree) is a vector of apple tree, and y(apple, apple tree) is a value obtained by multiplying the vector of apple and the vector of apple tree and adding all the vectors.

$$\text{Sigmoid}(x) = \frac{1}{1+e^{-x}} \quad [\text{Equation 2}]$$

Equation 1 represents an equation for calculating output values between apple and apple tree.

When a sigmoid function of Equation 2 is used for the value obtained by adding all values after multiplying the vector of apple and the vector of apple tree, an output value is obtained.

$$E = d(\text{apple tree}) - y(\text{apple, apple tree}) \quad \text{[Equation 3]}$$

Here, E is an error value and d(apple tree) is a correct answer value on the processing data.

As represented in Equation 3, the error value is represented by a value obtained by subtracting an output value y(apple, apple tree) from d(apple tree). Here, d(apple tree) means a correct answer value on the processing data. The correct answer value is 1 not in the antonym learning and is 0 in the antonym learning.

The word embedding learning unit 140 calculates a variation of W(apple tree) and W(apple) using the error value E. After calculating the variation, the word embedding learning unit 140 applies the variation only to W(apple). That is, the word embedding learning unit 140 applies the variation only to the weight value 604 connected to apple and does not apply the variation to the weight value 603 which is connected to apple tree.

As described above, the word semantic embedding apparatus 100 according to the exemplary embodiment of the present invention learns only using semantic information such as the definition, the hypernyms, and the antonyms of the word to be learned with data less than that of the learning model of the related art. For example, the word semantic embedding apparatus 100 needs 2.5 to 3 million learning data to learn a total of 387,152 words. That is, the word semantic embedding apparatus 100 performs the word embedding learning using less processing data.

Figure 7:
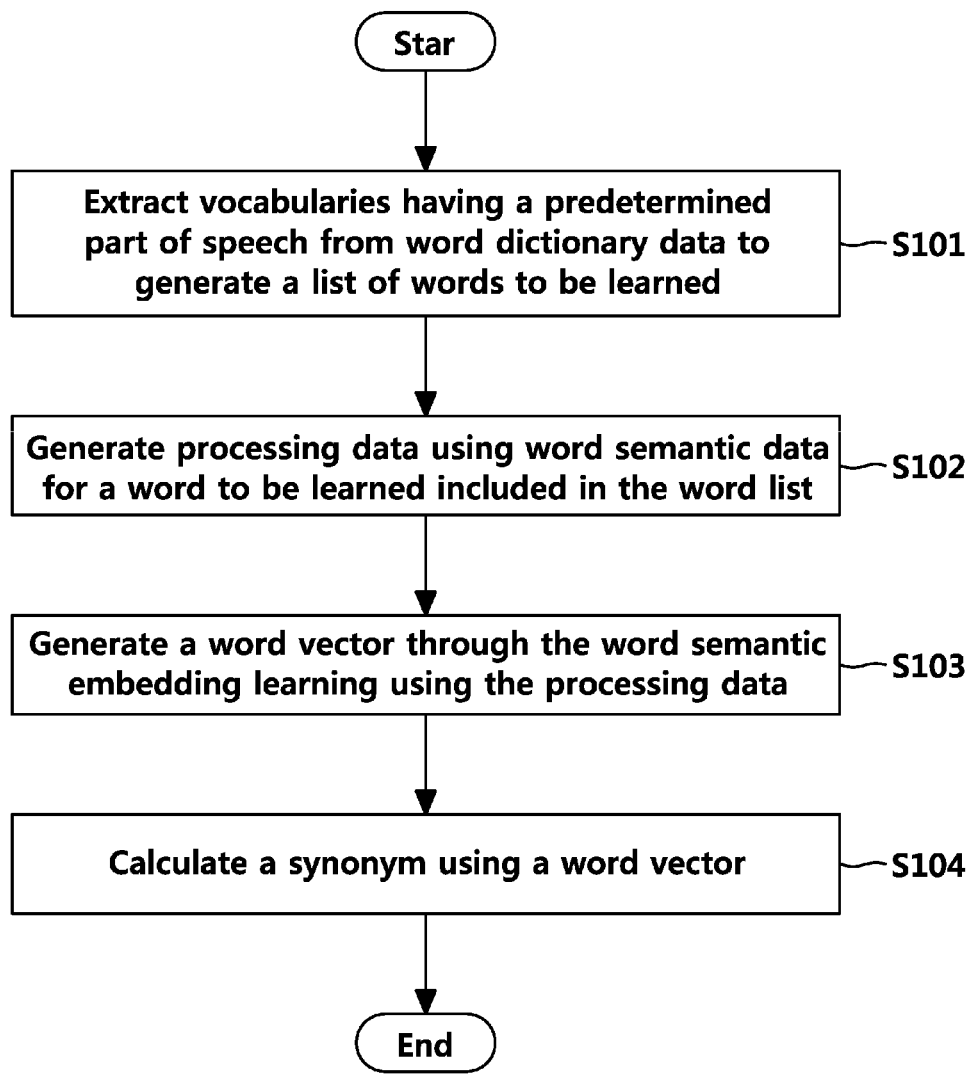
FIG. 7 is a flowchart of a word semantic embedding method using a lexical semantic network which is performed by a word semantic embedding apparatus according to an exemplary embodiment of the present invention.

FIG. 7 is a flowchart of a word semantic embedding method using a lexical semantic network which is performed by a word semantic embedding apparatus according to an exemplary embodiment of the present invention.

A word semantic embedding apparatus 100 using a lexical semantic network according to an exemplary embodiment of the present invention extracts vocabularies having a predetermined part of speech from word dictionary data to generate a list of words to be learned in step S101.

The word embedding apparatus 100 generates processing data using word semantic data for a word to be learned included in the generated word list in step S102. In this case, the word semantic embedding apparatus 100 brings the word semantic data from the lexical semantic network stored in the data storing unit 110.

Next, the word semantic embedding apparatus 100 generates a word vector through the word semantic embedding learning using the generated processing data in step S103.

The word semantic embedding apparatus 100 receives an input word and calculates a synonym using a word vector of an input word in step S104.

Figure 8:
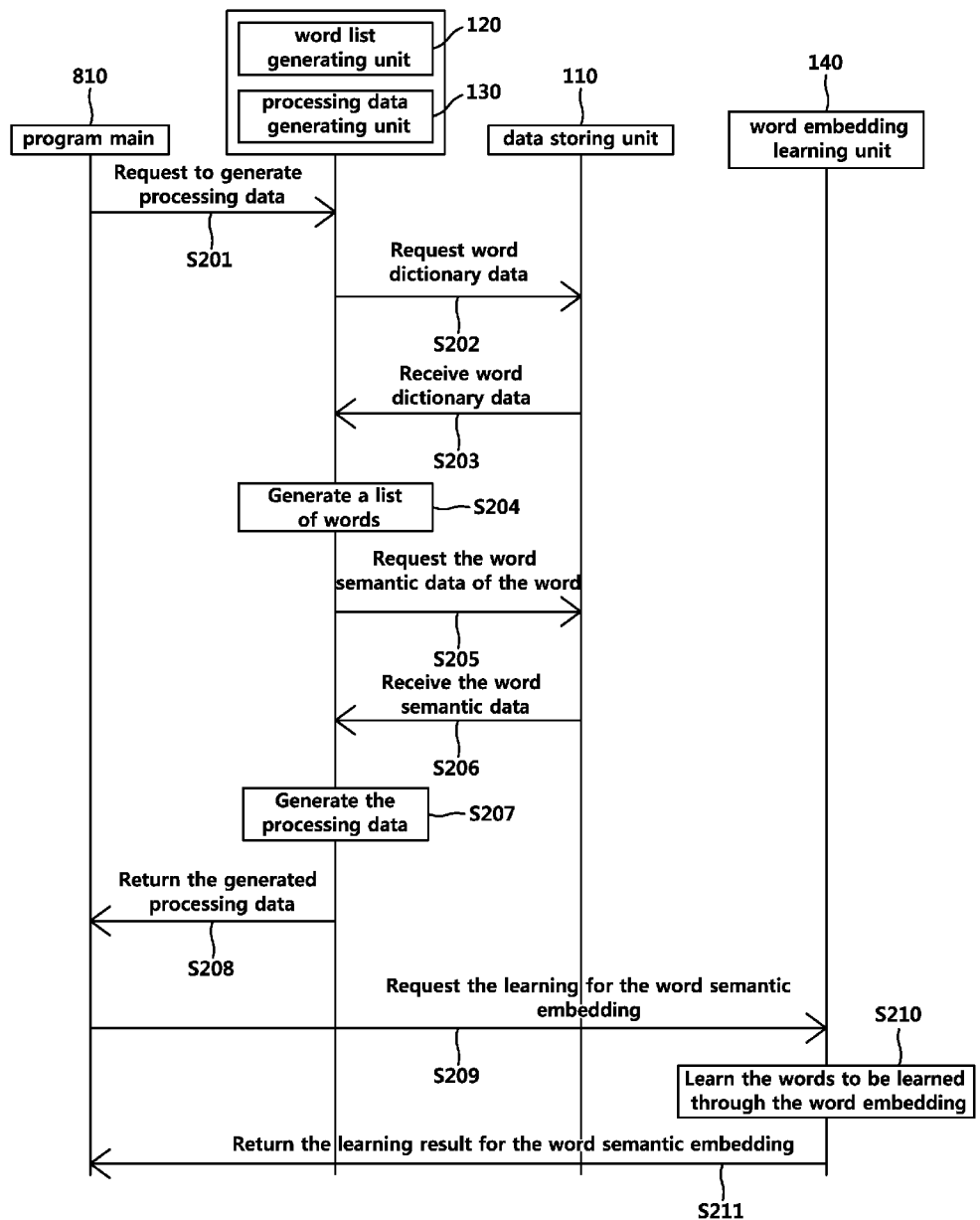
FIG. 8 is a detailed flowchart of a word list, processing data, and word embedding learning process in a word semantic embedding method according to an exemplary embodiment of the present invention.

FIG. 8 is a detailed flowchart of a word list, processing data, and word embedding learning process in a word semantic embedding method according to an exemplary embodiment of the present invention.

As illustrated in FIG. 8, the word semantic embedding apparatus 100 requests a processing data generating process and a word embedding learning process for word embedding learning through a program main 810 and returns the result.

First, the program main 810 requests the word list generating unit 120 and the processing data generating unit 130 to generate processing data for word semantic embedding in step S201.

The word list generating unit 120 requests word dictionary data, that is, lexical information of the word to the data storing unit 110 in step S202.

Next, the word list generating unit 120 receives word dictionary data, that is, lexical information of the word from the data storing unit 110 in step S203.

The word list generating unit 120 extracts vocabularies with a predetermined part of speech (for example, noun or predicate) from the returned word dictionary data to generate a list of words to be learned in step S204. Here, in the word list, an index number is assigned to each word.

Next, the processing data generating unit 130 requests the word semantic data (for example, definition of the word, hyponyms, and antonyms) of the word to be learned included in the list of words to be learned to the data storing unit 110 in step S205.

Next, the processing data generating unit 130 receives the word semantic data from the data storing unit 110 in step S206.

The processing data generating unit 130 generates the processing data using the list of words to be learned and the word semantic data (for example, word interpretation (definition), hyponyms, and antonyms) in step S207.

The processing data generating unit 130 returns the generated processing data to the program main 810 in step S208.

Next, the program main 810 requests the learning for the word semantic embedding to the word embedding learning unit 140 using the returned processing data in step S209.

The word embedding learning unit 140 learns the words to be learned through the word embedding learning using a feature mirror model based on the processing data to generate the word vector in step S210.

Next, the word embedding learning unit 140 returns the learning result for the word semantic embedding, that is, the word vector to the program main 810 in step S211.

In the meantime, a synonym recommendation result of the word semantic embedding apparatus 100 according to the exemplary embodiment of the present invention and the related arts will be described. Here, the related arts include NNLM, Ranking (hinge loss), Ranking (logit loss), and word2vec.

The word semantic embedding apparatus 100 according to the exemplary embodiment of the present invention uses a cosine similarity as represented in the following Equation 4.

$$\text{similarity} = \cos(\theta) = \frac{A \cdot B}{\|A\| \cdot \|B\|} = \frac{\sum_{i=1}^{n} A_i \times B_i}{\sqrt{\sum_{i=1}^{n} (A_i)^2} \times \sqrt{\sum_{i=1}^{n} (B_i)^2}} \quad \text{[Equation 4]}$$

Here, A and B indicate word vectors of two words A and B.

The word embedding technique of the related art is learned to simply form similar vectors by words whose previous or following words are similar in the sentence.

However, the word semantic embedding apparatus 100 according to the exemplary embodiment of the present invention uses the definition, hypernyms, antonyms which are the semantic information of the word so that semantically similar words form similar vectors.

Tables 1 and 2 represent a result of synonyms searched for "seoul_01/NNP" (a city located at the center of the Korean peninsula, the capital of Korea) using the related arts and the exemplary embodiment of the present invention.

In Table 1, results searched as synonyms similar to "Seoul_01/NNP" according to the related arts are represented.

TABLE 1

| NNLM[10] | Ranking (hinge loss)[11] | Ranking (logit loss) | Word2vec |
|---|---|---|---|
| Incheon/NNP | Japan/NNP | Busan/NNP | Gangnam-gu/NNP |
| Ulsan/NNP | USA/NNP | Daejeon/NNP | Yeongdeungpo-gu/NNP |
| Busan/NNP | Busan/NNP | China/NNP | Jung-gu/NNP |
| Chungbuk/NNP | China/NNP | USA/NNP | Busan/NNP |
| Gwangju/NNP | Germany/NNP | Japan/NNP | Seodaemun-gu/NNP |

In contrast, Table 2 represents results searched as synonyms similar to "Seoul_01/NNP" by the word semantic embedding apparatus 100 according to the exemplary embodiment of the present invention.

TABLE 2

| Synonym of present invention |
|---|
| Beijing/NNP |
| Rawalpindi/NNP |
| Brussels/NNP |
| Asmara/NNP |
| Sarajevo/NNP |

As represented in Tables 1 and 2, the word semantic embedding apparatus 100 according to the exemplary embodiment of the present invention strongly recognizes "Seoul_01/NNP" as semantic information of the capital to calculate names of cities which were or are capitals of respective countries as synonyms. However, according to the word embedding technique of the related art, words having a sentence structure similar to a sentence structure including "Seoul" are represented as synonyms so that a result in which the capital and the city are mixed or the city and a district are mixed may be obtained.

In the meantime, a synonym experiment result using the word semantic embedding apparatus 100 according to the exemplary embodiment of the present invention will be described.

During the experiment, the word semantic embedding apparatus 100 according to an exemplary embodiment of the present invention generates a list of words formed of 387,152 nouns and predicates through the lexical semantic network. The word semantic embedding apparatus 100 converts to a 50-dimensional vector through word embedding learning for processing data using the generated word list and the word semantic data.

Further, the experiment is performed to show the result of the word semantic embedding through three experimental methods.

TABLE 3

| Input word | List of synonyms |
|---|---|
| Drink | Inhalate_01, Nasals_03, Binge_02 |
| Cut_01 | Decline_03, Slit, Slice_02 |
| Fruit_01 | White cucumber_03, Fruit_01, Fruit tree |
| Portable phone | Cell phone, Simple wireless, Telegraph circuit |
| Translate | Render_07, Interpret_13, Retranslate_02 |

In Table 3, a result of searching for synonyms for one word is represented.

In Table 3, a list of closest words for one word is represented using a cosine similarity. Words which are semantically similar to or have the same hypernyms as each word are represented. However, in the case of "fruit", a word having a meaning of a tree with fruits like fruit trees may be obtained as a close word.

TABLE 4

| Input word 1 | Input word 2 | Similar word |
|---|---|---|
| Woman_02 | Teacher_01 | Female teacher |
| Italy | Noodle_01 | Pasta_01 |
| Soccer_04 | Stadium | Soccer field |
| Novice_01 | Student | Beginner scholar |
| France | Bread | Baguette |

In Table 4, a result of calculating synonyms of two nouns is represented.

In Table 4, a result of inputting two nouns and then extracting 200 words close to input word 2 using the cosine similarity is represented. Thereafter, a word having the highest similarity is obtained as a result by calculating the cosine similarity between the extracted 200 words and the input word 1. Even though a beginner (a first learner of something) is expected as a synonym of two words "novice_01" and "student", a beginner scholar (a person who first started study) which is not well used but is more precise is obtained.

TABLE 5

| Input word | (−)Attribute | (+)Attribute | Result |
|---|---|---|---|
| Motorcycle | Power_02 | Human | Rickshaw_03, Mess, Cart maker_03 |
| King_01 | Man_02 | Woman_02 | Heroin, Queen, Odd girl |
| Nuclear power plant | Nuclear power | Water power_01 | Run-off river type power station, Uphill road, Climbing |

In Table 5, a result of subtracting (−) or adding (+) a specific attribute of the word is represented.

Table 5 shows words having a higher similarity using the cosine similarity to the value obtained by simply subtracting and adding a vector of a specific attribute word from and to a vector of the input word.

When an attribute of "power_02" is subtracted from "motorcycle" and an attribute of "human" is added, a word "rickshaw_03" having a definition of "rickshaw" and "cart maker_03" having a definition of a person who makes a cart" appear.

However, the definition of human is strongly influenced so that "mess {an odd person who looks, behaves, and talks differently from a normal person}" also appears.

As described above, the word semantic embedding apparatus 100 according to the exemplary embodiment of the present invention performs the word embedding learning using semantic information of the word in a lexical map, that is, a lexical semantic network, rather than a corpus-based word embedding method of the related art.

Here, the word semantic embedding apparatus 100 according to the exemplary embodiment of the present invention performs the word embedding learning using semantic information rather than word embedding of the related art so that the word embedding learning is possible with less learning data and the learning time is shortened.

Further, the word semantic embedding apparatus 100 according to the exemplary embodiment of the present invention performs the learning based on interpretation of words to be learned, rather than simply appearing positional information so that it is efficient to learn words which less frequently appear and words appearing in the dictionary are the target so that more words than that of the word embedding of the related art may be expressed by a vector.

Furthermore, the word semantic embedding apparatus 100 according to the exemplary embodiment of the present invention performs the word semantic embedding learning as compared with the word embedding of the related art so that the relationship between words may be identified through the cosine similarity. The word semantic embedding apparatus 100 may find a homograph relationship or synonyms which cannot be obtained from the word embedding of the related art.

Further, the word semantic embedding apparatus 100 according to the exemplary embodiment of the present invention expands a list of words to be learned to adverbs and dependent nouns and additionally applies semantic information of the words.

Moreover, in the word semantic embedding apparatus 100 according to the exemplary embodiment of the present invention, human level semantic reasoning may be allowed using a word vector through word semantic embedding learning.

Figure 9:
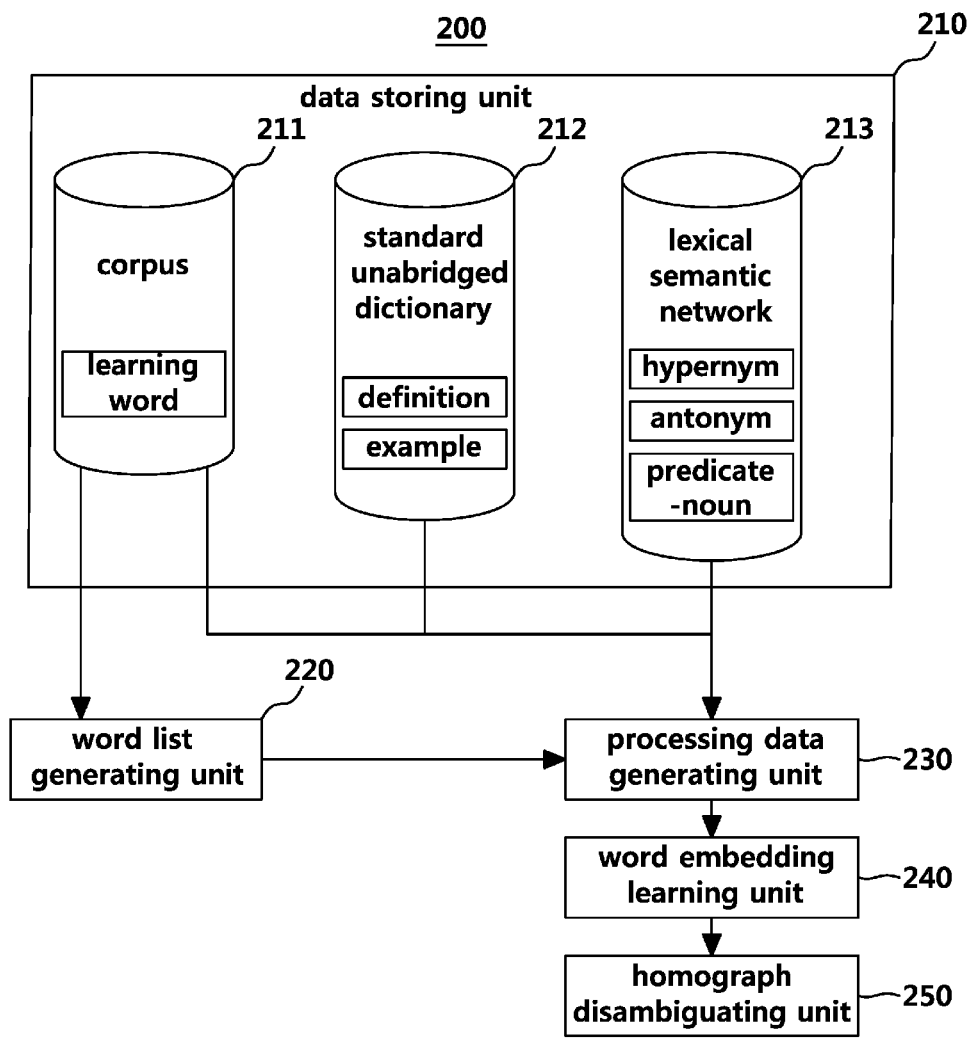
FIG. 9 is a diagram of a homograph disambiguating apparatus using a lexical semantic network and word embedding according to an exemplary embodiment of the present invention.

FIG. 9 is a diagram of a homograph disambiguating apparatus using a lexical semantic network and word embedding according to an exemplary embodiment of the present invention.

As illustrated in FIG. 9, a homograph disambiguating apparatus 200 using a lexical semantic network and word embedding according to an exemplary embodiment of the present invention includes a data storing unit 210, a word list generating unit 220, a processing data generating unit 230, a word embedding learning unit 240, and a homograph disambiguating unit 250.

The homograph disambiguating apparatus 200 according to the exemplary embodiment of the present invention learns various resources and generates a word vector of a substantial morpheme using a feature mirror model which is a modified skip gram model of the word embedding.

To this end, the homograph disambiguating apparatus 200 generates a list of words to be learned from a corpus 211. Further, the homograph disambiguating apparatus 200 converts a corpus 211 including a learning word and examples of the standard unabridged dictionary 212 into a form of corpus to learn. Further, the homograph disambiguating apparatus 200 converts a predicate-noun relation of the lexical semantic network 210 into a form of corpus to learn. Additionally, the homograph disambiguating apparatus 200 learns using a hypernym of the lexical semantic network 213 and the definition of the standard unabridged dictionary 212. Here, the antonym of the lexical semantic network 213 is used for the purpose of negative sampling. Tags are attached to all used learning resources at the level of homograph.

The homograph disambiguating apparatus 200 generates a word vector of a morpheme as a learning result through the word embedding learning. The homograph disambiguating apparatus 200 calculates a similarity of two morphemes using a word vector of the morphemes to disambiguate the homograph.

Here, the homograph disambiguating apparatus 200 according to the exemplary embodiment of the present invention is applicable not only to Korean by which the corpus 211, the standard unabridged dictionary 212, and the lexical semantic network 213 can be constructed but also to all languages such as English (WordNet) or Chinese (HowNet).

Hereinafter, specific configurations and operations of components of the homograph disambiguating apparatus 200 using a lexical semantic network and word embedding of FIG. 9 will be described.

The data storing unit 210 stores a corpus 211 including at least one learning word, a standard unabridged dictionary 212 including word semantic data, and a lexical semantic network 213. The data storing unit 210 stores the corpus 211 including at least one learning word, the standard unabridged dictionary 212 including an example and a definition as word semantic data, and the lexical semantic network 213 including predicate-noun relation information, hypernyms, and antonyms as word semantic data. For example, the corpus 211 is a predetermined corpus and a Sejong corpus may be applied.

The homograph disambiguating apparatus 200 according to the exemplary embodiment of the present invention uses the corpus 211, the standard unabridged dictionary 212, and the lexical semantic network 213 as a type of word to be learned and word semantic data. Here, the lexical semantic network 213 is also referred to as a lexical map. The lexical semantic network 213 refers to a lexical semantic network in which nouns, verbs or adjectives, and adverbial vocabularies are interconnected to each other with semantic constraints based on a standard dictionary.

The word list generating unit 220 generates a list of words to be learned from the corpus 211 stored in the data storing unit 210.

The processing data generating unit 230 brings word semantic data of words included in the word list to be learned generated in the word list generating unit 220 from the data storing unit 210 to process the word semantic data to be suitable for word embedding learning and generate learning processing data.

Here, the processing data generating unit 230 converts convertible word semantic data among word semantic data of a word to be learned included in the list of words to be learned generated in the word list generating unit 220 into a corpus.

Specifically, the processing data generating unit 230 converts at least one of the corpus 211 including at least one learning word, the example included in the standard unabridged dictionary 212, and the predicate-noun relation information included in the lexical semantic network 213 into a form of corpus.

The processing data generating unit 230 processes a word adjacent to the word to be learned and the hypernym of the adjacent word as an adjacent word of the word to be learned in the converted corpus or processes the predicate-noun relation information as an adjacent word of the word to be learned.

The processing data generating unit 230 processes the generated list of words to be learned, the converted corpus, and the word semantic data to be suitable for the embedding learning to generate the processing data.

The word embedding learning unit 240 learns words to be learned through the word embedding learning using a learning model formed of an input/output layer and a projection layer with the processing data generated in the processing data generating unit 230 to generate a word vector. In this case, the word embedding learning unit 240 may generate a word vector of a substantial morpheme which is adjacent to the word to be learned through the word embedding learning and excludes a postpositional particle or an end of the word.

Here, the word embedding learning unit 240 learns the words to be learned through the word embedding learning using a learning model formed of one input/output layer in which an input layer and an output layer of a skip-gram in the word embedding are combined and a mirror layer to generate the word vector. The word embedding learning unit 240 learns words to be learned through the word embedding learning using the learning model formed of the input/output layer and the mirror layer in which each processing data is located to generate a word vector.

Specifically, the word embedding learning unit 240 locates the processing data obtained by processing the word to be learned, the adjacent word, the predicate-noun relation information, and the antonym among the processing data in one input/output layer in which the input layer and the output layer of the skip gram in the word embedding are combined. The word embedding learning unit 240 learns words to be learned through the word embedding learning using the learning model formed of the input/output layer and the mirror layer in which each processing data is located to generate a word vector.

In this case, the word embedding learning unit 240 performs the word embedding learning through a feedforward process and a back propagation process of the word embedding learning. The word embedding learning unit 240 does not change the weight value connected to the processing data of a word to be learned, but changes the weight value connected to the word to be learned, during the back propagation process.

Further, the word embedding learning unit 240 may learn a wrong answer other than the processing data as a word to be learned, using negative sampling in the word embedding. The word embedding learning unit 240 performs negative sampling on the antonym. The word embedding learning unit 240 may learn by setting an output value as 0 only for the antonym. The word embedding learning unit 240 performs negative sampling on another homograph of the word to be learned. For example, when "사과_05/NNG" is learned, negative sampling may be performed on this word and another morpheme (사과_08/NNG) which is "사과" and whose part of speech is NNG.

In the meantime, the homograph disambiguating unit 250 compares the similarity between the homograph and the adjacent word using the word vector generated in the word embedding learning unit 240 and disambiguates the homograph in accordance with a comparison result.

Here, the homograph disambiguating unit 250 uses the word vector of the substantial morpheme. That is, the homograph disambiguating unit 250 compares the similarity between the substantial morpheme of the homograph to be disambiguated and the substantial morpheme of the adjacent word using the word vector of the substantial morpheme generated in the word embedding learning unit 240 to disambiguate the homograph.

As described above, the homograph disambiguating apparatus 200 according to the exemplary embodiment of the present invention treats not only the corpus, but also the example and the definition as simple corpuses to learn. The homograph disambiguating apparatus 200 generates a word immediately next to the word to be learned in the converted corpus or a word to appear in the morpheme as processing data. Further, the homograph disambiguating apparatus 200 uses the hypernym, the antonym, and the predicate-noun relation as processing data.

In the meantime, the homograph disambiguating apparatus 200 according to the exemplary embodiment of the present invention combines the corpus 211 and the example of the standard unabridged dictionary 212 to treat as one corpus. The word2vec of the related art or other known word embedding models are used for English and English corpus.

The homograph disambiguating apparatus 200 according to the exemplary embodiment of the present invention performs the word embedding learning by modifying the word embedding learning to be suitable for the characteristic of each language in order to be applied not only to English, but also to other languages (for example, Korean which is an agglutinative language).

For example, when the homograph disambiguating apparatus 200 according to the exemplary embodiment of the present invention is applied to Korean, Korean postpositional particles such as "eul" or "leul" or ends of word such as "hada" or "yeotta" do not have a word vector. That is, the word embedding learning unit 240 generates a word vector for a substantial morpheme such as general nouns NNG, verbs VV, and adjectives VA. The word embedding learning unit 240 remains only the substantial morpheme in the converted corpus and uses the immediately adjacent substantial morpheme for the word embedding learning. Further, the word embedding learning unit 240 may perform the negative sampling whenever the adjacent morpheme is learned a predetermined number of times (for example, once). The word embedding learning unit 240 performs negative sampling on a different homograph of the same morpheme as the substantial morpheme of the homograph which is randomly selected. For example, when the word embedding learning unit 240 learns "사과_05/NNG", the negative sampling is performed on a different morpheme (사과_08/NNG) whose morpheme is "apple" and part of speech is a general noun NNG.

In the meantime, a process of learning a lexical semantic network 213 with various information will be described as follows. The homograph disambiguating apparatus 200 according to the exemplary embodiment of the present invention uses the hypernym, the antonym, and the predicate-noun relation information among them. When the converted corpus is processed, the processing data generating unit 230 simultaneously processes the adjacent word and processes the hypernym of the word similarly to the adjacent word. The word embedding learning unit 240 performs negative sampling on the antonym.

The homograph disambiguating apparatus 200 may learn the predicate-noun relation information after performing the above-mentioned process on the entire converted corpuses one time. The homograph disambiguating apparatus 200 may learn by processing the predicate and the noun in the predicate-noun relation network to be adjacent to each other.

In the meantime, as illustrated in FIG. 2, the homograph disambiguating apparatus 200 according to the exemplary embodiment of the present invention uses a learning model in which the skip gram of the word embedding or word2vec is modified and the negative sampling to learn the words. Here, the input value and a result value of the processing data are expressed in a one-hot manner to be used.

Further, the homograph disambiguating apparatus 200 according to the exemplary embodiment of the present invention expresses the words by a 50 dimensional word vector.

FIG. 2 illustrates a learning model used in the exemplary embodiment of the present invention. The homograph disambiguating apparatus 200 learns a word A through main lines 201 and 202 using a weight value connected to a word B to learn the word A through the learning model. When the actual weight value is changed, the homograph disambiguating apparatus 200 changes only the weight 204 connected to the word A to be learned but does not change a weight value 203 connected to the word B.

Such a learning model is used to include information of words connected to the word B in the word embedding result of the word A. Further, the learning model as illustrated in FIG. 2 is used to obtain a semantic chain effect between words. In this case, the homograph disambiguating apparatus 200 learns by setting outputs values for the definition and the hypernym to be 1 and learns by setting an output value of the antonym to be 0.

Further, the homograph disambiguating apparatus 200 learns wrong answers other than the learning data for each word using the negative sampling to increase the accuracy of the learning.

Hereinafter, a difference between a skip gram model of the word embedding of the related art and a feature mirror model according to the exemplary embodiment of the present invention will be described with reference to FIGS. 3 and 10A-10B.

As illustrated in FIG. 3, a skip-gram model of the related art is an artificial neural network configured using three layers including an input layer, a projection layer, and an output layer.

A word to be learned is input to the input layer in a one-hot manner Previous two words w(t−2) and w(t−1) and following two words w(t+1) and w(t+2) of the word used in the input layer are input to the output layer to be learned. In the skip gram model illustrated in FIG. 3, a main line between the input layer and the projection layer and a main line between the projection layer and the output line are configured by different values ($W_1 \neq W_2$)

Figure 10:
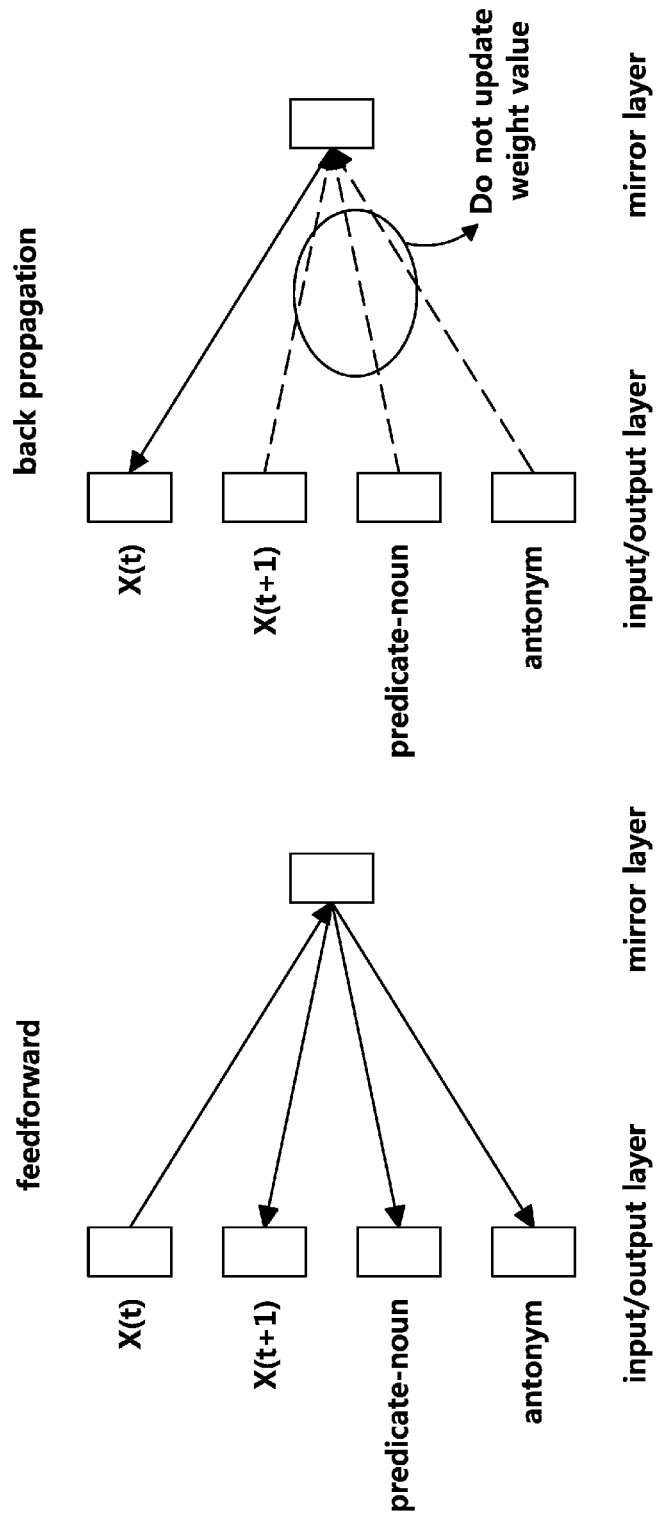
FIGS. 10A-10B are explanation views of a feature mirror model which is a modified skip gram model in a homograph disambiguating apparatus according to an exemplary embodiment of the present invention.

FIGS. 10A-10B are explanation views of a feature mirror model in a homograph disambiguating apparatus according to an exemplary embodiment of the present invention.

As illustrated in FIGS. 10A and 10B, the feature mirror model according to the exemplary embodiment of the present invention is formed of two layers. The feature mirror model is formed of one input/output layer in which an input layer and an output layer of the skip gram model of the related art are combined and a mirror layer.

In the input/output layer of the feature mirror model according to the exemplary embodiment of the present invention, a word X(t) to be learned and word semantic data of the word X(t) to be learned are processed in the one-hot manner to be input to the input/output layer. Here, the word semantic data of the word X(t) to be learned may include an adjacent word X(x+1) adjacent to the word X(t) to be learned, predicate-noun relation (V-N relation) information, and an antonym. For example, the word semantic data may include a word definition, hypernyms, and antonyms.

The homograph disambiguating apparatus 200 performs the word embedding learning through a feedforward process and a back propagation process of the word embedding learning. The homograph disambiguating apparatus 200 does not change the weight value connected to the word semantic data of a word to be learned, but changes the weight value connected to the word to be learned, during the back propagation process.

That is, when the learning is applied through the feature mirror model, the homograph disambiguating apparatus 200 according to the exemplary embodiment of the present invention changes only a main line (weight value) connected to a word to be learned, that is a target word x(target) but does not change a main line (weight value) connected to the word definition, hypernyms, and antonyms of the word to be learned.

Hereinafter, the learning process using the skip gram model of the related art and the skip gram model according to the exemplary embodiment of the present invention will be described with reference to FIG. 5.

The word embedding method of the related art learns the word using neighboring words of the word to be learned in a sentence. As illustrated in FIG. 5, when a word to be learned is "apple" in a sentence "I ate of an apple in the school", the neighboring words, that is, "school", "in", "of", and "ate" which are neighboring morphemes are used for the word embedding method. A word which may not be semantically related to "apple" which is a word to be learned, but is adjacent to the word to be learned in the sentence is used for the word embedding method. The word embedding method of the related art uses not only the neighboring substantial morpheme, but also adjacent postpositional particle or ends of word to learn.

Here, in the word embedding method of the related art, a large number of corpuses with a morpheme semantic number is necessary for the number of words and accuracy. The result of the word embedding is affected by the amount of corpuses so that the word embedding method of the related art is recommended to use a large number of corpuses.

In the meantime, the homograph disambiguating apparatus 200 according to the exemplary embodiment of the present invention uses a modified model of word2vec, that is, a model obtained by modifying the skip-gram. Learned words are calculated with the word vector value to remove an ambiguity of the homograph.

The similarity calculating process using a word vector of the substantial morpheme is as follows.

The homograph disambiguating apparatus 200 finds all word vector values corresponding to "사과" to remove the ambiguity of "사과" which is homographs in the sentence "I eat apple". Here, all word vector values include "apple (05)" (a fruit of apple tree) and "apology (08)" (admit his own fault and beg for forgiveness).

The homograph disambiguating apparatus 200 calculates a value using a word vector of "eat" (take food into stomach) and a cosine similarity as represented in Equation 5.

$$\text{similarity} = \cos(\theta) = \frac{A \cdot B}{\|A\| \cdot \|B\|} = \frac{\sum_{i=1}^{n} A_i \times B_i}{\sqrt{\sum_{i=1}^{n} (A_i)^2} \times \sqrt{\sum_{i=1}^{n} (B_i)^2}} \quad [\text{Equation 5}]$$

Here, A and B indicate word vectors of two words A and B.

Thereafter, the homograph disambiguating apparatus 200 determines a vector of "사과" having the highest value as a meaning of the word "apple" used in the sentence "I eat apple".

For example, in a sentence "pear is rotted", a process of removing the ambiguity of the homograph "배" will be described.

This sentence is not included in the Sejong corpus so that the sentence belongs to an unlearned pattern. To be precise, in the Sejong corpus, "pear" which has a meaning of fruit and the expression "rotted" are not adjacent. According to the learning methods of the related art, when such an unlearned pattern is generated, the accuracy is significantly lowered.

However, when the word vector generated by the homograph disambiguating apparatus 200 according to the exemplary embodiment of the present invention is used, a degree of lowering of accuracy rate is low. This is because a word vector direction of a fruit "pear" is similar to a vector of "fruit", "apple", or "food" which may be adjacent to "rot".

The reason for learning to be similar is that "fruit" appears as a hypernym of "pear" in the lexical semantic network 213. In addition, since an adjacent word of "pear" is similar to an adjacent word of "food" (for example, eat or shallow), it is learned such that the word vector becomes similar. A word vector of "apple" or "food" is adjacent to a verb "rot" in some cases. Vectors of adjacent words become similar. As a result, a word vector of fruit "pear" is similar to "rot".

The homograph disambiguating apparatus 200 according to the exemplary embodiment of the present invention performs a negative sampling process such that word vectors of different meanings (for example, ship or stomach) of " 배 " are spaced apart from each other in different directions. Therefore, the word vector of " 배 " which means a ship is significantly different from the word vector of a fruit " 배 ". That is, the similarity of the word vector of " 배 " which means a ship and the vector of "rot" is low.

That is, the homograph disambiguating apparatus 200 according to the exemplary embodiment of the present invention uses the word vector generated through the word embedding learning for the disambiguating process so that it is strong for an unlearned pattern. Further, the homograph disambiguating apparatus 200 additionally learns the lexical semantic network 213 and performs negative sampling on homographs with different semantic numbers (for example, negative sampling is performed on a fruit " 배 " and a ship " 배 "), so that the homographs may be more precisely disambiguated.

In the meantime, a process of learning a word to be learned, "apple (which can eat)" using the feature mirror model will be described.

The homograph disambiguating apparatus 200 uses word semantic data of "apple tree" and "fruit" obtained by extracting a noun and a predicate from a fruit of an apple tree which is a definition of apple, as processing data. Further, the homograph disambiguating apparatus 200 adds "fruit" which is a hypernym of "apple" which is a word to be learned as processing data of apple. Here, there is no antonym of "apple" which is a word to be learned, so that the antonym is not added as the processing data. If there is an antonym, the antonym is added.

After finding "apple tree", "seed", and "fruit" as the processing data of apple which is a word to be learned, word embedding learning is performed using the learning model at the right.

For example, a word embedding learning process using "apple" which is a word to be learned and a word of "apple tree" which is a definition will be described with reference to Equations 6 and 7.

$$y_{(apple, apple\ tree)} = \varphi\left[\sum_{n=0}^{m}(W_{n(apple)} * W_{n(apple\ tree)})\right] \quad \text{[Equation 6]}$$

Here, Wn(apple) is a vector of apple, Wn(apple tree) is a vector of apple tree, and y(apple, apple tree) is a value obtained by multiplying the vector of apple and the vector of apple tree and adding all the vectors.

$$\text{Sigmoid}(x) = \frac{1}{1+e^{-x}} \quad \text{[Equation 7]}$$

Equation 6 represents an equation for calculating output values between apple and apple tree.

When a sigmoid function of Equation 7 is used for the value obtained by adding all values after multiplying the vector of apple and the vector of apple tree, an output value is obtained.

$$E = d(\text{apple tree}) - y(\text{apple, apple tree}). \quad \text{[Equation 8]}$$

Here, E is an error value and d(apple tree) is a correct answer value on the processing data.

As represented in Equation 8, the error value is represented by a value obtained by subtracting an output value y(apple, apple tree) from d(apple tree). Here, d(apple tree) means a correct answer value on the processing data. The correct answer value is 1 not in the antonym learning and is 0 in the antonym learning.

The word embedding learning unit 240 calculates a variation of W(apple tree) and W(apple) using the error value E. After calculating the variation, the word embedding learning unit 240 applies the variation only to W(apple). That is, the word embedding learning unit 140 applies the variation only to the weight value 604 connected to apple and does not apply the variation to the weight value 603 which is connected to apple tree.

Figure 11:
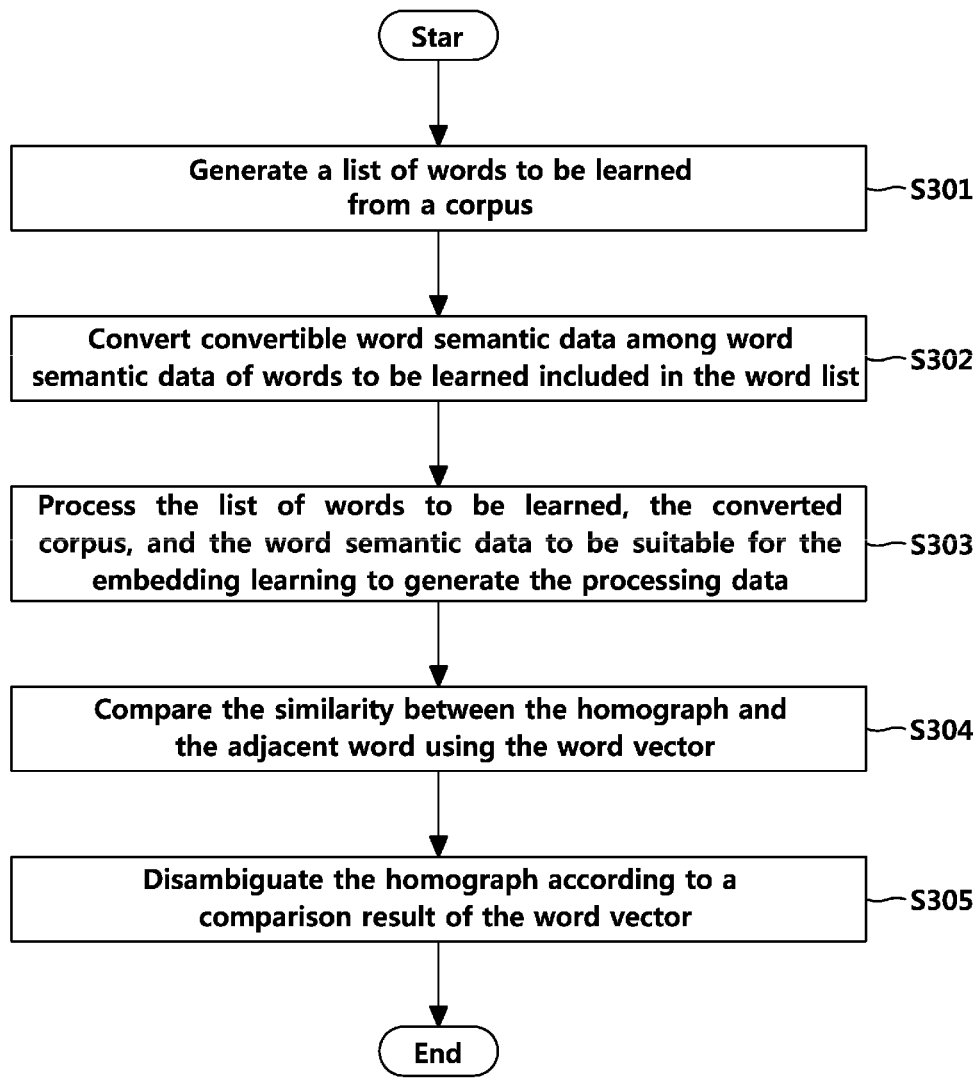
FIG. 11 is a flowchart of a homograph disambiguating method using a lexical semantic network and word embedding performed by a homograph disambiguating apparatus according to an exemplary embodiment of the present invention.

FIG. 11 is a flowchart of a homograph disambiguating method using a lexical semantic network and word embedding performed by a homograph disambiguating apparatus according to an exemplary embodiment of the present invention.

The homograph disambiguating apparatus 200 according to the exemplary embodiment of the present invention generates a list of words to be learned from a corpus including at least one learning word in step S301.

The homograph disambiguating apparatus 200 converts convertible word semantic data among word semantic data of words to be learned included in the generated word list into a corpus in step S302. In this case, the homograph disambiguating apparatus 200 brings the word semantic data from the corpus 211, the standard unabridged dictionary 212, and the lexical semantic network 213 stored in the data storing unit 210.

Next, the homograph disambiguating apparatus 200 processes the generated list of words to be learned, the converted corpus, and the word semantic data to be suitable for the embedding learning to generate the processing data in step S303.

Next, the homograph disambiguating apparatus 200 learns word to be learned through the word embedding learning using a learning model formed of an input/output layer and a projection layer with the generated processing data to generate a word vector. The homograph disambiguating apparatus 200 compares the similarity between the homograph and the adjacent word using the generated word vector in step S304.

Next, the homograph disambiguating apparatus 200 disambiguates the homograph according to a comparison result in step S304, in step S305.

In the meantime, an experiment process and a result of an experiment performed by the homograph disambiguating apparatus 200 according to the exemplary embodiment of the present invention will be described with reference to Table 6.

The homograph disambiguating apparatus 200 according to the exemplary embodiment of the present invention makes the homographic morphemes to be a word vector to process a pattern which has not been learned and compares the similarity between the homograph and the substantial morpheme of the adjacent word.

Here, during the process of making a word to be a vector, the learning corpus 211, the standard unabridged dictionary 212, and the lexical semantic network 213 are used. A result which is sufficiently meaningful in a small size experiment on the following unlearned patterns is represented in Table 6.

TABLE 6

| Noun to be disambiguated | Adjacent morpheme | Correct answer |
|---|---|---|
| Apple | Fruit_01/NNG | Apple_05/NNG |
| Pear | Rot/VV | Pear_03/NNG |
| Noodle | Boil/VV | Noodle_08/NNG |

Table 6 represents a part of a simple experiment test set.

A simplified experimental environment is configured to simply check whether the homograph disambiguating apparatus 200 according to the exemplary embodiment of the present invention is meaningful.

First, for the experiment, a noun with various homographs which evenly appear, that is, a noun having a relatively low baseline is selected (for example, 사과).

A morpheme (for example, fruit) which may be adjacent to "사과" but is never adjacent in the learning corpus 211 is determined. In Table 6, only three examples from the test set used for the experiment are represented.

For example, the homograph disambiguating apparatus 200 according to the exemplary embodiment of the present invention receives "사과" and "fruit_01/NNG" and when "apple_05/NNG" is calculated as the most similar word to the "fruit" among the homographs of "사과", the answer is correct.

The homograph disambiguating apparatus 200 according to the exemplary embodiment of the present invention selects 18 correct answers among a total of 24 answers. Even though the test set is very small, it is understood that the homograph disambiguating apparatus 200 according to the exemplary embodiment of the present invention is meaningful.

As described above, according to the exemplary embodiment of the present invention, in order to disambiguate a homograph which is applicable not only to Korean, but also to all languages such as English and Chinese, the learning is performed through the word embedding learning and the similarity between word vectors is compared to disambiguate the homograph.

The homograph disambiguating apparatus 200 according to the exemplary embodiment of the present invention uses not only the corpus 211, but also the standard unabridged dictionary 212 and the lexical semantic network 213 for word embedding learning. As represented in Table 6, a simple experiment was performed only with an unlearned pattern and a meaningful result was obtained.

Just an accuracy rate of the unlearned pattern which is a very low baseline level may be expected by the method of the related art. Therefore, the homograph disambiguating apparatus 200 according to the exemplary embodiment of the present invention may be used as a follow-up supplementary module for a pattern which is not reproduced by a homograph disambiguating unit of the related art. Further, when the homograph disambiguating apparatus is used as the follow-up supplementary module, the overall accuracy may be improved. That is, when the homograph disambiguating apparatus 200 is applied, a homograph disambiguating unit which stably operates for an unlearned pattern may be provided. As described above, the homograph disambiguating apparatus 200 according to the exemplary embodiment of the present invention may be combined with a homograph disambiguating unit UTagger of the related art.

Further, the homograph disambiguating apparatus 200 may also generate word vectors for a dependent noun, adverbs, suffixes, or prefixes. Since the word vectors have a characteristic different from the general noun or the predicate, the homograph disambiguating apparatus 200 changes the word vector in accordance with the characteristic to perform the word embedding learning.

The exemplary embodiments of the present invention which have been described above are examples and it is obvious to those skilled in the art that various changes or modifications may be made without departing from the spirit and scope of the present invention. Accordingly, the various exemplary embodiments disclosed herein are not intended to limit the technical spirit of the present invention but describe with the true scope and spirit being indicated by the following claims and the scope of the technical spirit of the present invention is not limited to the exemplary embodiments. The protective scope of the present disclosure should be construed based on the following claims, and all the technical concepts in the equivalent scope thereof should be construed as falling within the scope of the present disclosure.

The invention claimed is:

1. A word semantic embedding apparatus using a lexical semantic network, the apparatus comprising:
   a data storing unit to store:
      a corpus including a learning word,
      a standard unabridged dictionary including examples and definitions stored in word semantic data, and
      the lexical semantic network including predicate-noun relation information, hypernyms, and antonyms stored in the word semantic data;
   a word list generating unit to extract vocabularies having a predetermined part of speech and generate a list of words to be learned;
   a processing data generating unit to bring the generated list of words to be learned and the word semantic data of a word to be learned included in the list of words to be learned from the data storing unit and process the data suitable for word embedding learning to generate processing data; and
   a word embedding learning unit to learn the word to be learned through the word embedding learning using a learning model formed of an input/output layer and a projection layer with the generated processing data to generate a word vector.

2. The word semantic embedding apparatus of claim 1, further comprising:
   a synonym calculating unit to calculate a cosine similarity using the generated word vector to calculate synonyms of the input word.

3. The word semantic embedding apparatus of claim 2, wherein the synonym calculating unit receives first and second input words, extracts words closest to the second input word as a predetermined number of synonyms using the cosine similarity and calculates the cosine similarity between the extracted synonyms and the first input word to calculate a word having the highest similarity as a synonym of the first and second input words.

4. The word semantic embedding apparatus of claim 2, wherein the synonym calculating unit calculates a synonym obtained by modifying an attribute of an input word through an attribute calculating process of a word vector of the input word and a word vector of an attribute word having a predetermined attribute.

5. The word semantic embedding apparatus of claim 1, wherein the word list generating unit extracts vocabularies having a predetermined part of speech from the lexical semantic network in which nouns, verbs or adjectives, adverbs, and dependent nouns are interconnected to each other with semantic constraints to generate a list of words to be learned.

6. The word semantic embedding apparatus of claim 1, wherein the processing data generating unit generates learning processing data using word semantic data including at least one of a definition, hypernyms, and antonyms of a word included in the generated list of words to be learned.

7. The word semantic embedding apparatus of claim 1, wherein the word embedding learning unit learns a wrong answer other than the processing data using negative sampling in the word embedding as a word to be learned.

8. The word semantic embedding apparatus of claim 1, wherein the word embedding learning unit locates processing data in which the word to be learned and word semantic data of the word to be learned are processed, among the processing data, in one input/output layer in which an input layer and an output layer of skip-gram in the word embedding are combined and learns the word to be learned through the word embedding learning using a learning model formed of the input/output layer and a mirror layer in which the processing data is located to generate a word vector.

9. The word semantic embedding apparatus of claim 1, wherein the word embedding learning unit performs the word embedding learning through a feedforward process and a back propagation process of the word embedding learning and does not change a weight value connected to word semantic data of a word to be learned and changes a weight value connected to the word to be learned, during the back propagation process.

10. A homograph disambiguating apparatus using a lexical semantic network and word embedding, the apparatus comprising:
a data storing unit to store a corpus including at least one learning word, a standard unabridged dictionary including word semantic data, and the lexical semantic network;
a word list generating unit to generate a list of words to be learned from the corpus;
a processing data generating unit to convert convertible word semantic data among word semantic data of a word to be learned included in the generated word list into a corpus and process the generated list of words to be learned, the converted corpus, and the word semantic data to be suitable for the word embedding learning to generate a processing data;
a word embedding learning unit to learn the word to be learned through the word embedding learning using a learning model formed of an input/output layer and a projection layer with the generated processing data to generate a word vector; and
a homograph disambiguating unit to compare a similarity between a homograph and adjacent words using the generated word vector and disambiguate a homograph in accordance with a comparison result;
wherein the standard unabridged dictionary includes examples and definitions stored in the word semantic data, and
wherein the lexical semantic network includes predicate-noun relation information, hypernyms, and antonyms stored in the word semantic data.

11. The homograph disambiguating apparatus of claim 10, wherein the processing data generating unit converts at least one of a corpus including at least one learning word, examples and definitions included in a standard unabridged dictionary, and predicate-noun relation information included in the lexical semantic network into a form of corpus.

12. The homograph disambiguating apparatus of claim 10, wherein the processing data generating unit processes a word adjacent to the word to be learned and the hypernym of the adjacent word to be an adjacent word of the word to be learned in the converted corpus or processes the predicate-noun relation information to be an adjacent word of the word to be learned.

13. The homograph disambiguating apparatus of claim 10, wherein the word embedding learning unit locates processing data in which the word to be learned, the adjacent word, the predicate-noun relation information, and the antonyms are processed, among the processing data, in one input/output layer in which an input layer and an output layer of skip-gram in the word embedding are combined and learns the word to be learned through the word embedding learning using a learning model formed of the input/output layer and a mirror layer in which the processing data is located to generate a word vector.

14. The homograph disambiguating apparatus of claim 10, wherein the word embedding learning unit performs the word embedding learning through a feedforward process and a back propagation process of the word embedding learning and does not change a weight value connected to processing data of a word to be learned and changes a weight value connected to the word to be learned, during the back propagation process.

15. The homograph disambiguating apparatus of claim 10, wherein the word embedding learning unit learns a wrong answer other than the processing data using negative sampling in the word embedding as a word to be learned.

16. The homograph disambiguating apparatus of claim 10, wherein the word embedding learning unit generates a word vector of a substantial morpheme which is adjacent to the word to be learned and excludes a postpositional particle or an end of word through word embedding learning.

17. The homograph disambiguating apparatus of claim 10, wherein the homograph disambiguating unit compares a similarity between a substantial morpheme of a homograph to be disambiguated and a substantial morpheme of the adjacent word using the word vector of the generated substantial morpheme to disambiguate the homograph.

18. A homograph disambiguating method using a lexical semantic network and word embedding, the method comprising:
generating a list of words to be learned from a corpus including at least one learning word;
converting convertible word semantic data among word semantic data of a word to be learned included in the generated word list into a corpus;
generating processing data by processing the generated list of words to be learned, the converted corpus, and the word semantic data suitable for word embedding learning;

generating a word vector by learning the word to be learned through the word embedding learning using a learning model formed of an input/output layer and a projection layer with the generated processing data; and
comparing a similarity between a homograph and adjacent words using the generated word vector and disambiguating a homograph in accordance with a comparison result;
wherein the standard unabridged dictionary includes examples and definitions stored in the word semantic data, and
wherein the lexical semantic network includes predicate-noun relation information, hypernyms, and antonyms stored in the word semantic data.

19. The homograph disambiguating method of claim 18, wherein in the converting into a corpus, convertible word semantic data among word semantic data in a standard unabridged dictionary including examples and definitions, predicate-noun relation information, and a lexical semantic network including hypernyms and antonyms is converted into a corpus.

* * * * *